United States Patent
Nakatsugawa et al.

(10) Patent No.: US 9,183,067 B2
(45) Date of Patent: Nov. 10, 2015

(54) DATA PRESERVING APPARATUS, METHOD AND SYSTEM THEREFOR

(71) Applicant: KABUSHIKI KAISHA TOSHIBA, Minato-ku (JP)

(72) Inventors: Minoru Nakatsugawa, Yokohama (JP); Takeichiro Nishikawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 142 days.

(21) Appl. No.: 14/077,569

(22) Filed: Nov. 12, 2013

(65) Prior Publication Data

US 2014/0143610 A1 May 22, 2014

(30) Foreign Application Priority Data

Nov. 19, 2012 (JP) .................................. 2012-253455

(51) Int. Cl.
*G06F 11/00* (2006.01)
*G06F 11/14* (2006.01)

(52) U.S. Cl.
CPC .......... *G06F 11/008* (2013.01); *G06F 11/1458* (2013.01); *G06F 11/1461* (2013.01)

(58) Field of Classification Search
CPC .................................................. G06F 11/3466
See application file for complete search history.

(56) References Cited

U.S. PATENT DOCUMENTS

| | | | | |
|---|---|---|---|---|
| 7,827,446 B2 * | 11/2010 | Kimura et al. | ................... | 714/43 |
| 8,260,750 B1 * | 9/2012 | Gugick et al. | ................ | 707/645 |
| 2004/0148485 A1 * | 7/2004 | Suzuki | ........................ | 711/170 |
| 2008/0154979 A1 * | 6/2008 | Saitoh et al. | .................. | 707/202 |

FOREIGN PATENT DOCUMENTS

| | | |
|---|---|---|
| JP | 2006-202254 | 8/2006 |
| JP | 2007-213670 | 8/2007 |
| JP | 2010-49729 | 3/2010 |
| JP | 2010-225021 | 10/2010 |
| JP | 4973145 | 4/2012 |

* cited by examiner

*Primary Examiner* — Christopher McCarthy
(74) *Attorney, Agent, or Firm* — Oblon, McClelland, Maier & Neustadt, L.L.P.

(57) ABSTRACT

A data preserving apparatus includes: a generator generating scenarios that represent presence or absence of occurrence of a failure, presence or absence of a failure symptom, a time point of occurrence of a failure, and a time point of occurrence of a failure symptom; an evaluator calculating the amount of data loss in the case of occurrence of a failure for the scenario based on first and second backup intervals before and after occurrence of a failure symptom; an backup interval evaluator calculating a number of backups performed until earlier one of a time point of occurrence of a failure and a time point after a predetermined time period; a cost evaluator calculating a cost evaluation values for the scenarios based on the amount of data loss and the number of backups; and a calculator calculating the first and second backup intervals based on cost evaluation values for scenarios.

12 Claims, 29 Drawing Sheets

| DATA TYPE | COST |
|---|---|
| PERSONAL INFORMATION | 5 |
| SOURCE CODE | 4 |
| PRESENTATION MATERIAL | 3 |
| TEXT FILE | 2 |
| MUSIC FILE | 1 |

| DATA SIZE | COST |
|---|---|
| 1GB | 5 |
| 100MB | 4 |
| 10MB | 3 |
| 1MG | 2 |
| 100KB | 1 |

| THE NUMBER OF DATA REFERENCE | COST |
|---|---|
| 1000 | 5 |
| 100 | 4 |
| 10 | 3 |
| 1 | 2 |
| 0 | 1 |

| BACKUP FREQUENCY (BEFORE OCCURRENCE OF FAILURE SYMPTOM) | COST |
|---|---|
| 10 TIMES | 10 |
| 5 TIMES | 8 |
| 3 TIMES | 6 |
| 2 TIMES | 4 |
| 1 TIME | 2 |

| BACKUP FREQUENCY (AFTER OCCURRENCE OF FAILURE SYMPTOM) | COST |
|---|---|
| 10 TIMES | 5 |
| 5 TIMES | 4 |
| 3 TIMES | 3 |
| 2 TIMES | 2 |
| 1 TIME | 1 |

| DATA STORAGE | COST |
|---|---|
| 1GB | 5 |
| 100MB | 4 |
| 10MB | 3 |
| 1MB | 2 |
| 100KB | 1 |

| DATA COMMUNICATION | COST |
|---|---|
| 1GB | 5 |
| 100MB | 4 |
| 10MB | 3 |
| 1MB | 2 |
| 100KB | 1 |

| OPERATION YEARS | COST |
|---|---|
| 1 YEAR OR LESS | 5 |
| 2 YEARS OR LESS | 4 |
| 3 YEARS OR LESS | 3 |
| 4 YEARS OR LESS | 2 |
| 5 YEARS OR LESS | 1 |

| REPLACEMENT DEVICE TYPE | COST |
|---|---|
| HIGH END | 5 |
| MIDRANGE | 4 |
| ENTRY | 3 |

FIG. 20

| | |
|---|---|
| PRODUCT ID | 6548D26H |
| OBSERVED TIME POINT | 2009/8/17 9:21 |
| CPU TEMPERATURE | 43°C |
| CURRENT | 3.2A |
| HDD POWER-ON TIME | 1425h |
| HDD TEMPERATURE | 43°C |
| THE NUMBER OF HDD HEAD LOADING AND UNLOADING TIMES | 6124 |
| THE NUMBER OF HDD BAD SECTORS | 31 |
| HDD READ ERROR RATE | 0.021 |

FIG. 27

| FAILURE SYMPTOM MODEL VARIABLE | PARAMETER(COEFFICIENT) |
|---|---|
| HDD POWER-ON TIME | 0.3 |
| HDD TEMPERATURE | 0.2 |
| THE NUMBER OF HDD HEAD LOADING AND UNLOADING TIMES | 0.3 |
| THE NUMBER OF HDD BAD SECTOR | 0.6 |
| HDD READ ERROR RATE | 0.7 |
| CONSTANT TERM | 0.2 |

FIG. 28

| FAILURE PROBABILITY | 0.9 |
|---|---|
| OPERATION TIME | 8000h |
| ELAPSED YEARS FROM INSTALLATION | 4 YAERS |
| HDD READ ERROR RATE | 0.1 |

FIG. 29

| BACKUP INTERVAL ALTERNATIVE |
| --- |
| 1 MONTH |
| 1 WEEK |
| 1 DAY |
| HALF A DAY |
| 1 HOUR |

FIG. 30

| USER NAME | HDD RANK | FAILURE PROBABILITY | AMOUNT OF DATA LOSS (DAY) |
| --- | --- | --- | --- |
| A | ABOUT TO FAILURE | 0.98 | 2 |
| B | ABOUT TO FAILURE | 0.96 | 7 |
| C | ABOUT TO FAILURE | 0.93 | 31 |
| D | DANGER | 0.77 | 0 |
| E | DANGER | 0.75 | 16 |
| F | DANGER | 0.71 | 5 |
| G | WARNING | 0.58 | 11 |
| H | WARNING | 0.55 | 1 |

FIG. 31

| FAILURE PROBABILITY | BACKUP INTERVAL ALTERNATIVE 1 | BACKUP INTERVAL ALTERNATIVE 2 | BACKUP INTERVAL ALTERNATIVE 3 |
|---|---|---|---|
| 0.001 | 1 MONTH | HALF A MONTH | 2 MONTHS |
| 0.005 | 1 WEEK | 3 DAYS | 2 WEEKS |
| 0.030 | 1 DAY | HALF A DAY | 2 DAYS |
| 0.060 | HALF A DAY | 6 HOURS | 1 DAY |
| 0.720 | 1 HOUR | HALF AN HOUR | 2 HOURS |

FIG. 34

DATA PRESERVING APPARATUS, METHOD AND SYSTEM THEREFOR

CROSS REFERENCE TO RELATED APPLICATIONS

This application is based upon and claims the benefit of priority from the prior Japanese Patent Application No. 2012-253455 filed on Nov. 19, 2012, the entire contents of which are incorporated herein by reference.

FIELD

Embodiments described herein relate to a data preserving apparatus that determines a backup interval for data in a storage device included in a computer, a method and a system therefor.

BACKGROUND

A method has been known that predicts failures of an HDD (hard disk drive), and automatically makes a backup or recommends backing up when a failure is predicted. Another method has been known that preferentially backs up files with high priority. Furthermore, a method has been known that backups may be periodically made. Moreover, a method has been known that when files are updated, differences may be automatically backed up. There are commercial backup tools, such as ARCserve, Backup Exec, and NetVault. These tools make backups irrespective of the failure probabilities of HDDs.

As described above, the method that predicts failures and makes a backup has already been known. Furthermore, the method of preferentially backing up files with high degrees of importance has already been known.

However, the effect of the conventional methods is data preservation of a HDD at the time when a failure is predicted. Unfortunately, there is no advantageous effect of achieving continuous data preservation even after failure prediction due to optimization of backup intervals before and after detection of a failure symptom and due to optimization of a replacement reference.

In the present situation, backup is a good faith effort by PC users, but is not managed in most cases. Conventionally, only when a failure is predicted, backup is automatically performed or recommended. However, an appropriate backup interval for continuous backup after detection of a failure symptom has been unknown. Typically, replacement of PCs and HDDs are determined on the basis of an elapsed time after installation. Thus, an optimal replacement reference based on the failure risk of the entire PC/HDD to be managed has not been determined.

BRIEF DESCRIPTION OF THE DRAWINGS

FIG. 18 is a diagram showing an example of a data loss cost storage;

FIG. 19 is a diagram showing an example of a backup cost storage;

FIG. 20 is a diagram showing a configuration of a replacement cost storage;

FIG. 27 is a diagram showing a specific example of operation data;

FIG. 28 is a diagram showing an example of a failure symptom model storage;

FIG. 29 is a diagram showing an example of a replacement reference alternative storage;

FIG. 30 is a diagram showing an example of a backup interval alternative storage;

FIG. 31 is a diagram showing an example of information displayed by a visualizer;

FIG. 34 is a diagram showing an example of a backup interval alternative storage.

DETAILED DESCRIPTION

According to one embodiment, there is provided a data preserving apparatus that determines a backup interval of a storage device having data stored therein, including: a failure occurrence scenario generator, a data loss amount evaluator, a backup interval evaluator, a cost evaluator, a backup interval optimizing calculator and a backup interval changer.

The failure occurrence scenario generator randomly generates a plurality of scenarios that represent presence or absence of occurrence of a failure, presence or absence of a failure symptom, a time point of occurrence of a failure in a case with occurrence of a failure, and a time point of occurrence of a failure symptom in a case with a failure symptom, on the basis of operation data of a computer provided with the storage device, a failure symptom detecting model for detecting a failure symptom from the operation data, and a failure rate of the storage device.

The data loss amount evaluator calculates an amount of data loss due to a failure on the scenario with occurrence of the failure among the scenarios, on the basis of a first backup interval that is a backup interval used before occurrence of a failure symptom, and a second backup interval that is a backup interval used after occurrence of a failure symptom.

The backup interval evaluator calculates a number of backups performed for each of the scenarios, on the basis of the first backup interval and the second backup interval.

The cost evaluator calculates a cost evaluation value on the basis of the amount of data loss and the number of backups for each of the scenarios.

The backup interval optimizing calculator determines the first backup interval and the second backup interval such that a total of the cost evaluation values for the respective scenarios or an average of the cost evaluation values for the respective scenarios is minimized or less or equal to than a threshold.

The backup interval changer notifies to the computer at least the second backup interval out of the first backup interval and the second backup interval that are determined by the backup interval optimizing calculator.

Hereinafter, embodiments will be discussed with reference to the accompanying drawings.

Figure 1:
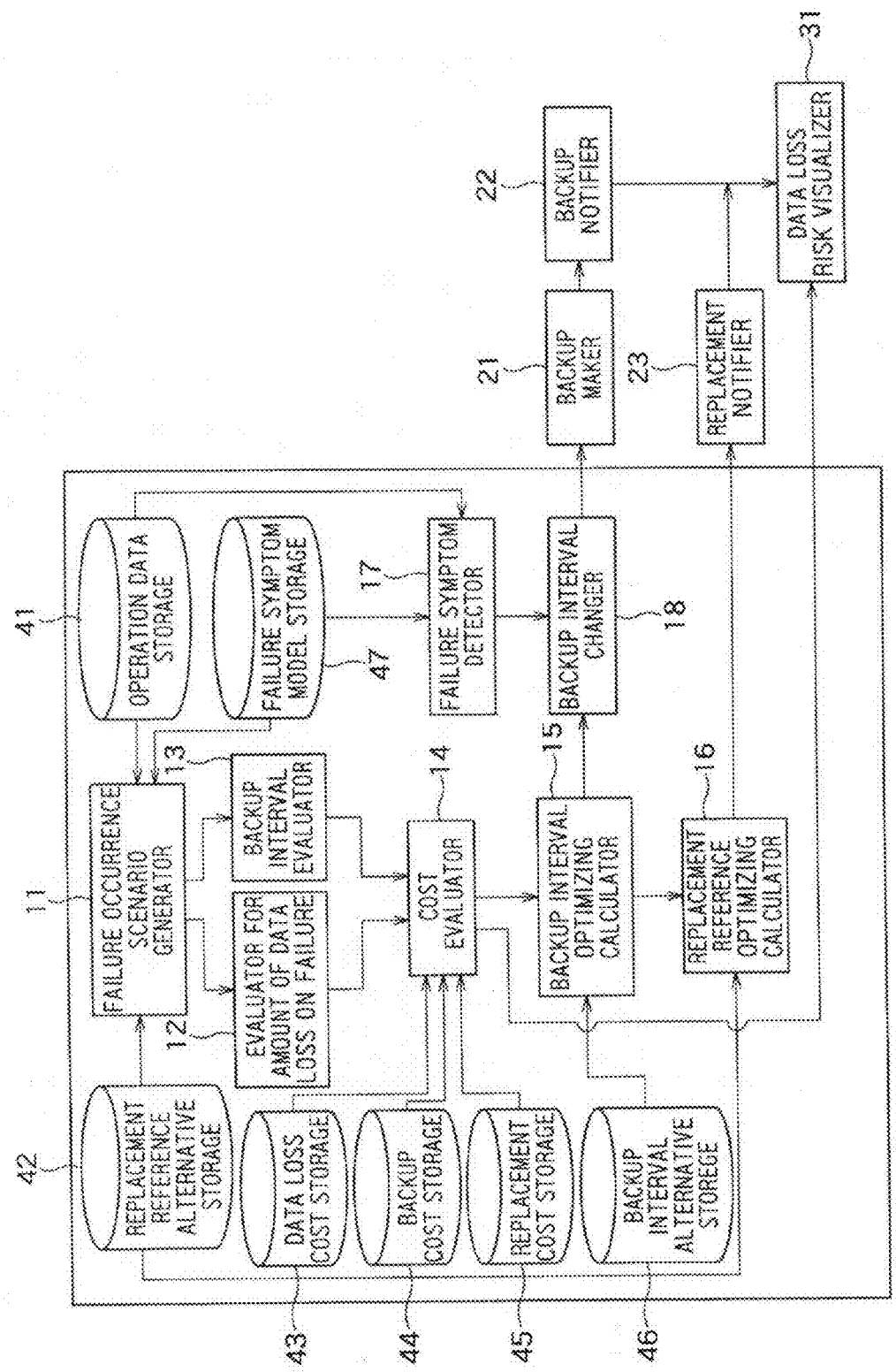
FIG. 1 is a diagram showing a system including a data preserving apparatus according to Embodiment 1.

FIG. 1 is a block diagram showing a basic configuration of a data preservation system including a data preserving apparatus according to Embodiment 1.

The data preserving apparatus relates to setting of an appropriate backup interval for data, such as files, in a storage device included in a computer, such as a PC, (hereinafter uniformly referred to as PC) according to a risk of occurrence of a failure in the storage device, and setting of a replacement reference of the storage device or PC.

The PC backs up data in the storage device at the backup interval (frequency) notified from the data preserving apparatus. The storage device may be any of media capable of storing data, such as an HDD, SDD, and a memory device. Note that backup is copying of data in the storage device to a different storage medium. In the backup, a difference from preceding backup data is backed up. A destination of backup may be a different storage device in the same PC, a storage device externally-connected to a PC, or a storage device included in another computer on a network.

A backup maker 21, a backup notifier 22 and a replacement notifier 23 are included in the PC. A data loss risk visualizer 31 is included in a management server. The data preserving apparatus, the PC and the server are connected to each other via the network. A configuration where the data loss risk visualizer 31 is included in the data preserving apparatus may be adopted.

An operation data storage 41 stores operation data on the PC or an HDD in the PC. The operation data is sensor log information on the PC and HDD. For instance, the operation data includes ID information, such as a serial number, and HDD S.M.A.R.T., such as HDD power-on time, and further includes sensor log data, and a data acquisition date. The operation data may be acquired according to any of methods, i.e., at certain intervals, on occurrence of an event (e.g., power-on), or on a predetermined date. The operation data may include data on HDDs of a plurality of PCs, and operation data of an HDD of one PC. Instead, the operation data may include a flag on whether the HDD is normal or has a failure. FIG. 27 shows an example of the operation data.

Figure 32:
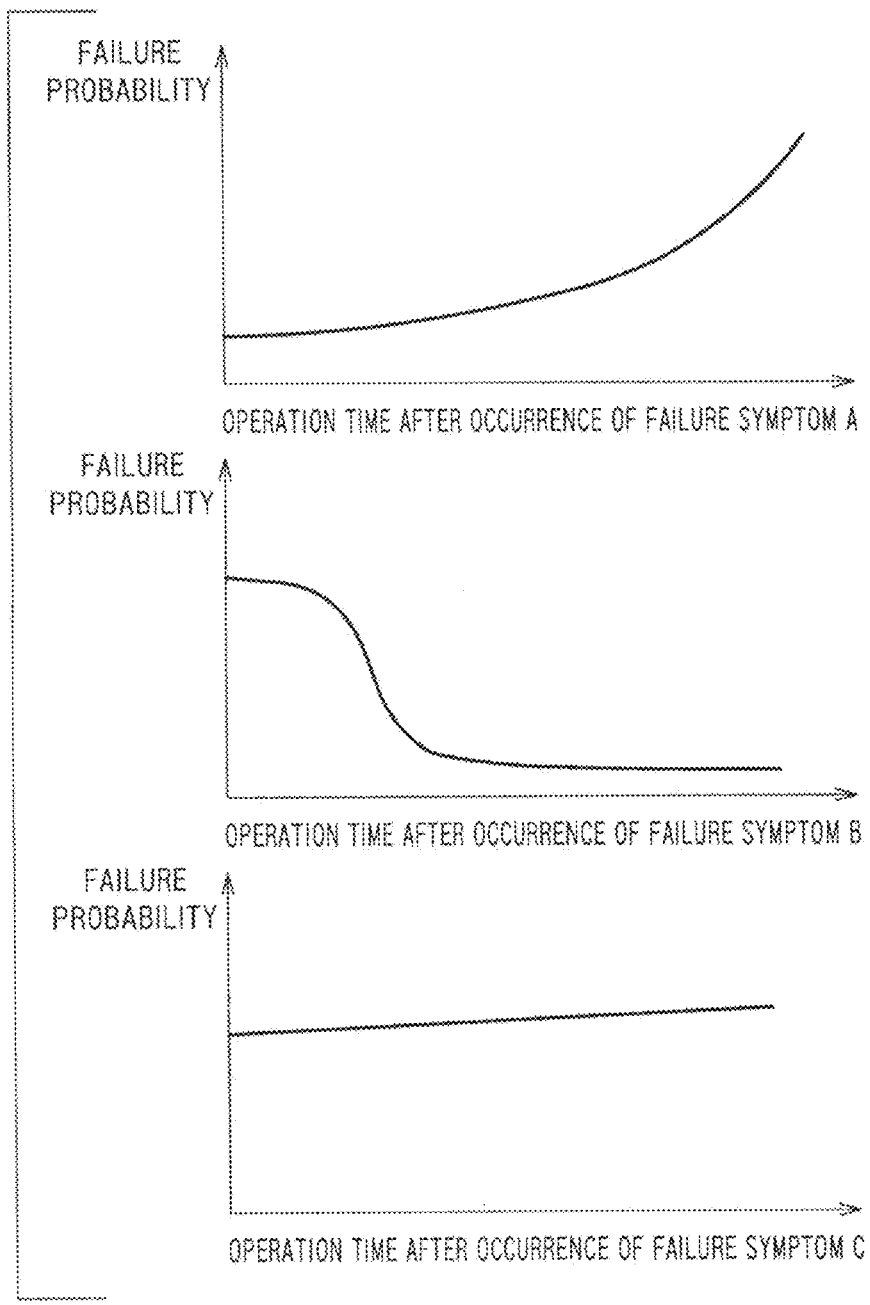
FIG. 32 is a graph of relationship between an operation time from occurrence of a failure symptom and a failure probability.

A failure symptom model storage 47 stores any or plural items of an accuracy rate of a model for determining failure symptom occurrence in the HDD, a distribution of survival time from occurrence of a failure symptom to a failure, and a parameter of the failure symptom model. FIG. 32 shows examples of the distribution of survival time for the respective failure symptoms A, B and C. The failure symptom model includes a model type, the parameter described above, and after-mentioned variables of the model. The failure symptom model is preliminarily stored in the failure symptom model storage 47. However, this model may be generated from the operation data. In this case, the operation data includes the flag on whether the HDD is normal or has a failure.

The accuracy rate of the model includes any or plural items of the failure rate in the case of detecting an HDD failure symptom (failure symptom detection rate in a failed device), the failure rate without detection of an HDD symptom (failure symptom non-detection rate in a failed device), the preliminary symptom detection rate during HDD normal operation (false detection rate of a failure symptom in a normal device), and the failure symptom non-detection rate during HDD normal operation (normal detection rate in a normal device).

The "failure rate in the case of detecting an HDD failure symptom" is a probability that a failure actually occurs in a predetermined time period after a failure symptom is detected.

The "failure rate without detection of an HDD symptom" is a probability that a failure is detected but no HDD failure symptom is detected in a predetermined time period before occurrence of the failure.

The "preliminary symptom detection rate during HDD normal operation" is a probability that a failure symptom is detected but no failure occurs in a predetermined time period after detection of the failure symptom.

The "failure symptom non-detection rate during HDD normal operation" is a probability that no failure occurs and no failure symptom is detected in a predetermined time period therebefore.

The failure symptom model is constructed using any of models, such as the support vector machine, and the logistic regression model. In the case of the logistic regression, representation is made by the following expression.

$$\text{Failure probability } P(x) = \frac{1}{1 + \exp(a_1 x_1 + a_2 x_2 + \ldots a_n x_n + b)} \quad \text{[Expression 1]}$$

where "x" denotes a variable of the failure symptom model, "a" and "b" denote parameters (coefficients) of the failure symptom model. FIG. 28 shows examples of the variable and the parameters. If the failure probability of the model is not less than a threshold, it can be determined that a failure symptom occurs. Instead, a method may be adopted that determines that a failure symptom occurs, directly from the operation data. For instance, if the number of bad sectors is not less than a threshold, it is determined that a failure symptom occurs. The failure symptom model is common to all PCs. However, models specific to device types may be adopted.

A replacement reference alternative storage 42 stores alternatives for a reference with which the PC and HDD are replaced. The reference for replacement includes a threshold of elapsed days from installation of the PC, a threshold of a probability that the HDD causes a failure in a certain time period (HDD failure probability), a threshold of an HDD operation time, a threshold of an HDD sensor log value, or two or more of the thresholds. FIG. 29 shows four examples of the replacement reference.

Figure 7:
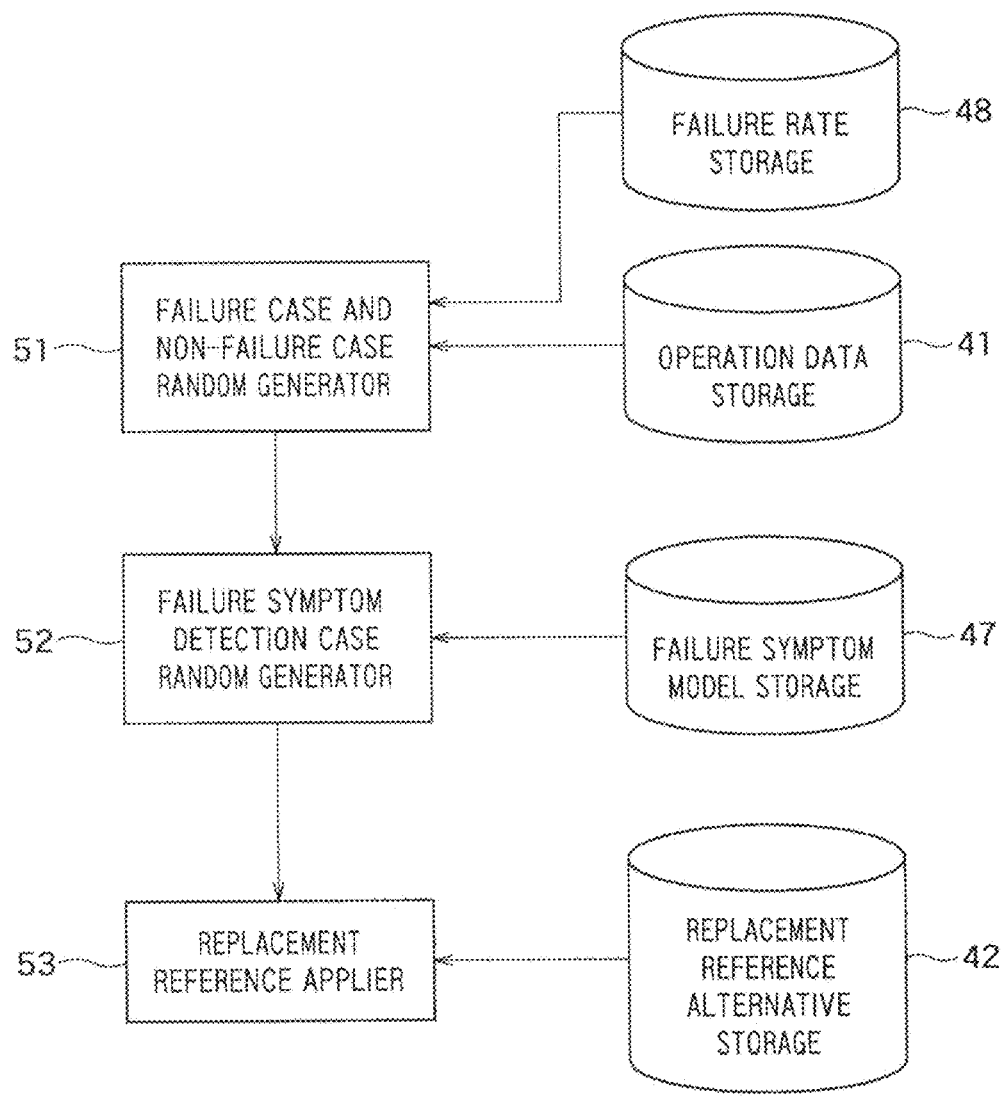
FIG. 7 is a block diagram pertaining to failure occurrence scenario generation.
Figure 8:
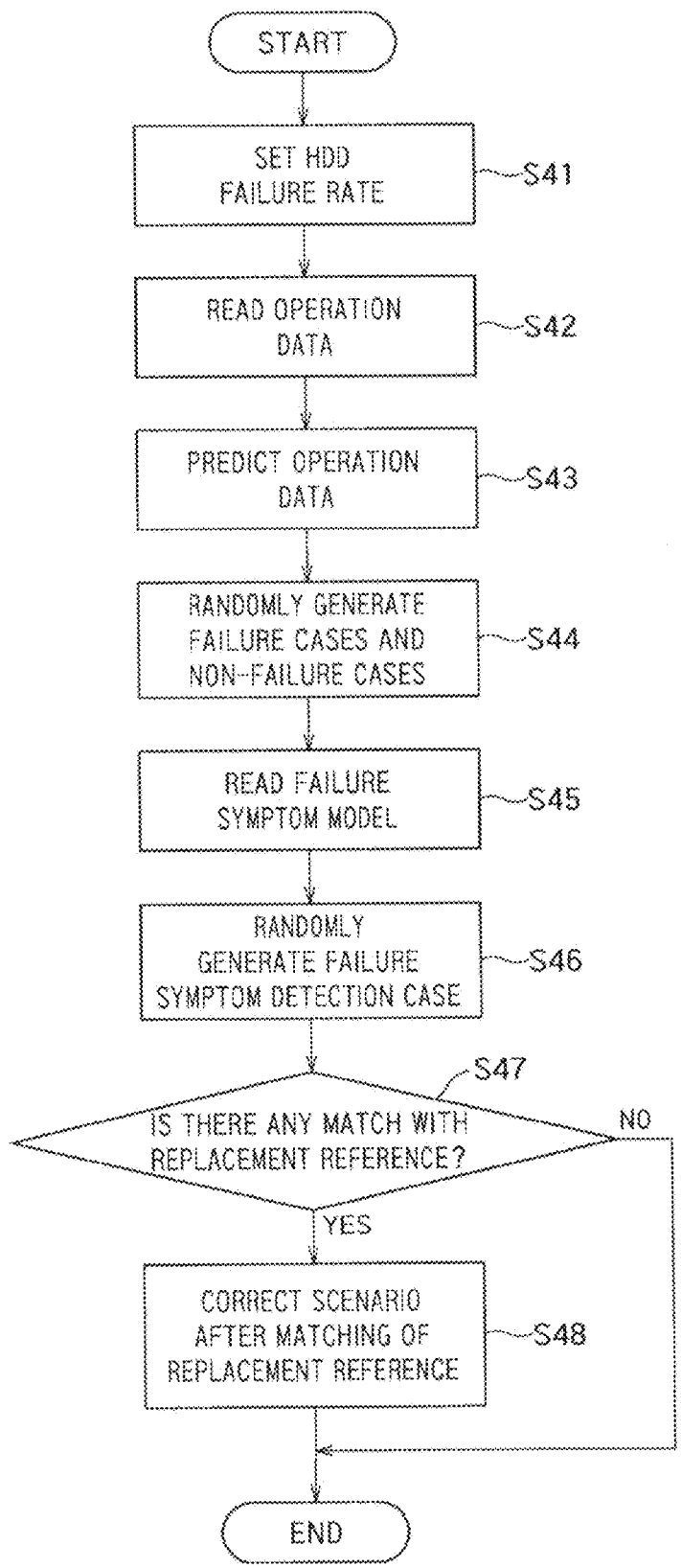
FIG. 8 is a flowchart pertaining to failure occurrence scenario generation.

A failure occurrence scenario generator 11 randomly generates a plurality of scenarios (failure occurrence scenarios) that indicate examples of HDD failure cases and non-failure cases, and presence or absence of failure symptom detection of the HDD failure cases and non-failure cases. The scenario may include the types of failure symptoms. FIG. 7 shows the configuration of the failure occurrence scenario generator 11 and various storages to be used. A failure rate storage 48 is omitted in FIG. 1. FIG. 8 shows an operation flow of the failure occurrence scenario generator 11.

First, a failure case and non-failure case random generator 51 reads the operation data (including the number of devices, and days) up to the current time point (S42). On the basis of the operation data, a predictive value of operation data in the future is calculated (S43). Furthermore, an HDD failure rate is calculated on the basis of the predictive value according to the failure symptom model. HDD failure cases and non-failure cases are randomly generated on the basis of the HDD failure rate (S44). The prediction on future operation data may be according to any known method. For instance, linear regression may be used. Instead, prediction may be made by calculating the average of operation data over a certain time before then.

Instead, a simple configuration may be adopted. A failure rate per unit time may be preliminarily provided. The failure cases and non-failure cases may be randomly generated, on the basis of the failure rate, according to the operation time. The failure rate may be preliminarily stored in the failure rate storage 48, and the failure rate may be read in step S41. In this case, the prediction on future operation data in step S43 may be omitted.

Next, a failure symptom detection case random generator 52 randomly generates examples of presence or absence of detection of a failure symptom in the failure cases and the non-failure cases, according to the accuracy rate of the failure symptom model stored in the failure symptom model storage 47 (e.g., the failure symptom detection rate in a failed device, the failure symptom non-detection rate in a failed device, the normal detection rate in a normal device, and the false detection rate of a failure symptom in a normal device) (S45 and S46). The relationship between the operation time after occurrence of the failure symptom and the failure probability shown in FIG. 32 can be used for the random generation.

It may be randomly selected which type of failure symptom occurs on the basis of the items of the failure symptom model (see failure symptom model variables FIG. 28), and the failure symptom occurrence time may be generated from the relationship between the operation time after occurrence of the failure symptom and the failure probability.

An example of a simulation will hereinafter be shown as a specific example for randomly generating HDD failure cases and non-failure cases, types of failure symptoms, and examples of presence or absence of detecting a failure symptom in the failure cases and non-failure cases.

It is defined that "t=0" represents the current time point, "T" denotes a simulation completion time point (sufficiently large values). It is defined that in the case where a failure occurs at time point t, "$R_t$" is "1". It is also defined that in the case where no failure occurs, "$R_t$" is "0". It is further defined that "p" denotes a failure rate per unit time. The probabilities "$P(R_t=1)$" and "$P(R_t=0)$" are thus represented as follows, $$P(R_t=1)=p(1-p)^{t-1} (0<t<T)$$

$$P(R_t=0)=(1-p)^t (0<t<T)$$

The above "p" is constant irrespective of time. Instead, "p" may be a time-variable function "p(t)". In this case, "p(t)" may be calculated from the operation data on the corresponding time point according to the model.

"$D_t$" is "1" if a failure symptom occurs at time "t"; "0", without occurrence. It is defined that "q" is a preliminary symptom detection rate in the case of occurrence of an HDD failure. "$P(D_t=1|R_t=1)$" and "$P(D_t=0|r_t=1)$" are represented as follows:

$$P(D_t=1|R_t=1)=q(t-t') (0<t'<t)$$

$$P(D_t=0|R_t=1)=1-q(t-t') (0<t'<t)$$

As described above, "q" is a time-variable function varying according to "t-t'". Instead, "q" may be a constant value without temporal variation. "q" is stored in the failure symptom model storage 47.

It is defined that "r" is a failure symptom non-detection rate during HDD normal operation. "$P(D_t=1|R_t=0)$" and $$P(D_t=1|R_t=0)=r(t-t') (0<t'<t)$$

$$P(D_t=0|R_t=0)=1-r(t-t') (0<t'<t)$$

Likewise, "r" is a time-variable function varying according to "t-t'". Instead, "r" may be a constant value without temporal variation. "r" is stored in the failure symptom model storage 47.

Figure 33:
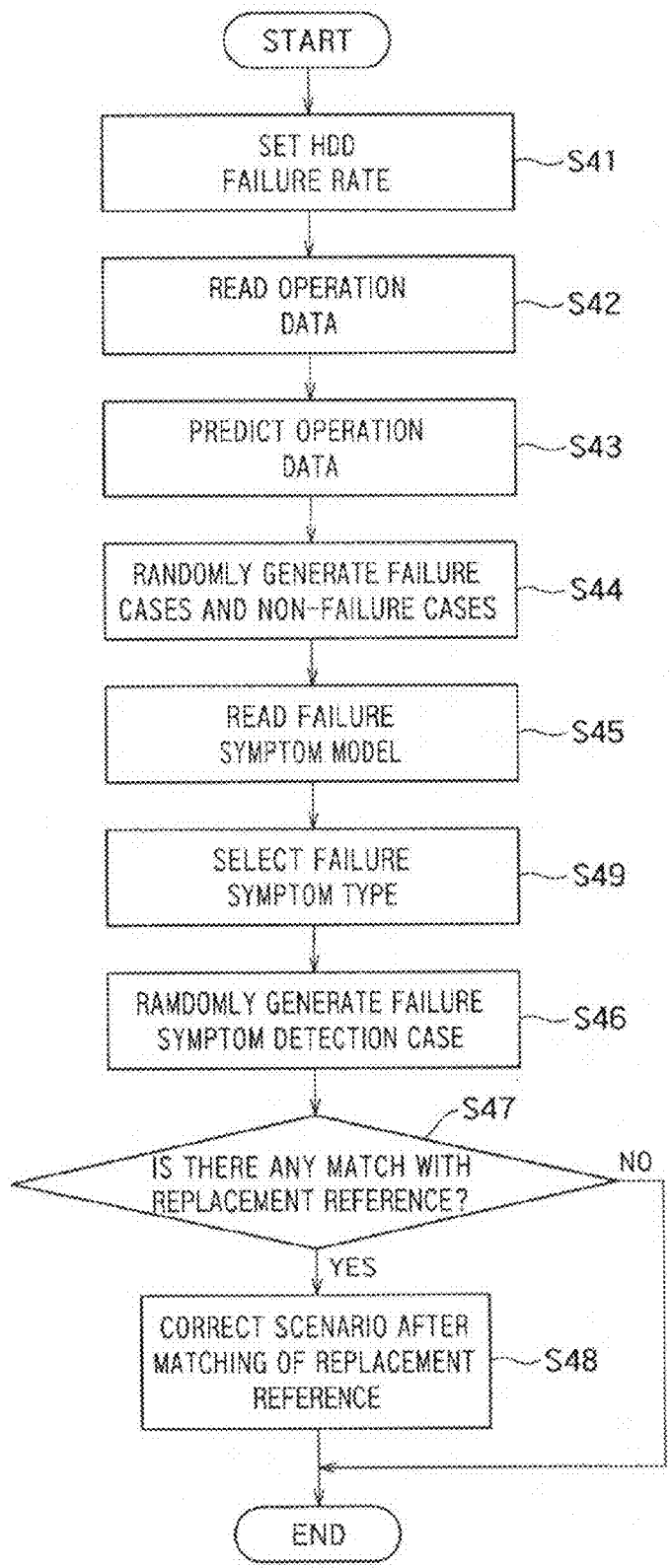
FIG. 33 is a flowchart pertaining to failure occurrence scenario generation (in consideration of failure symptom types)

As a flow of FIG. 33, in the case of discussing failure rate transition that is different according to types of failure symptoms, the types of failure symptoms are randomly selected, and different "$q_m$" and "$r_m$" are used according to the type "m" of the failure symptoms. "$q_m$" and "$r_m$" are preliminarily calculated from the operation data and stored in the failure symptom model storage 47. In the flow of FIG. 33, step S49 of randomly selecting the failure symptom type is added. The other steps are the same as those in FIG. 8. "P(m)" is an occurrence probability "$s_m$" of a failure symptom of a type "m".

The type of the failure symptom is randomly selected according to the occurrence probability of each type.

$$P(m)=s_m (\Sigma_m s_m=1)$$

$$P(D_t=1|R_t=1)=q_m(t-t') (0<t'<t)$$

$$P(D_t=0|R_t=1)=1-q_m(t-t') (0<t'<t)$$

$$P(D_t=1|R_t=0)=r_m(t-t') (0<t'<t)$$

$$P(D_t=0|R_t=0)=1-r_m(t-t') (0<t'<t)$$

The simulation randomly generates HDD failure cases and non-failure cases, types of failure symptoms, and examples of presence or absence of detection of a failure symptom in the failure cases and non-failure cases, according to the probability calculated as described above.

Figure 9:
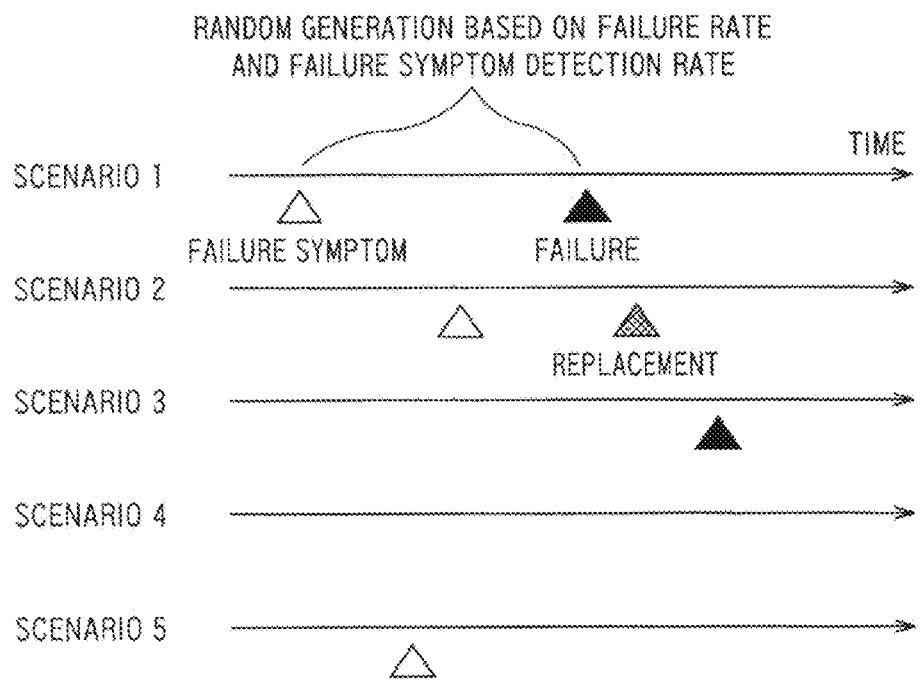
FIG. 9 is a diagram showing a specific example of failure occurrence scenario generation.

FIG. 9 illustrates the failure occurrence scenario. In a scenario 1, an HDD failure occurs after detection of a failure symptom. In a scenario 2, the HDD or PC is replaced after detection of a failure symptom. In a scenario 3, the HDD then causes a failure without detection of a failure symptom. In a scenario 4, the HDD causes no failure. In a scenario 5, a failure symptom is detected, but the HDD causes no failure thereafter.

A replacement reference applier 53 applies a reference stored in the replacement reference alternative storage 42

(one or a plurality of references (alternatives) are preliminarily selected), and determines whether there is a time point matching with the replacement reference (S47). If a matching time point exists, a part of the scenario after replacement is corrected on the basis of the storage device or PC after replacement (S48). Information on the storage device or PC to be replaced is preliminarily provided.

Figure 10:
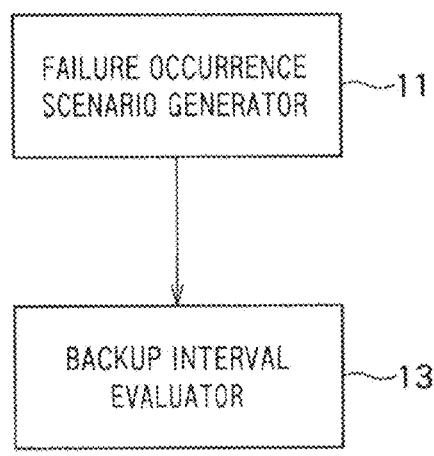
FIG. 10 is a block diagram pertaining to backup interval evaluation.
Figure 11:
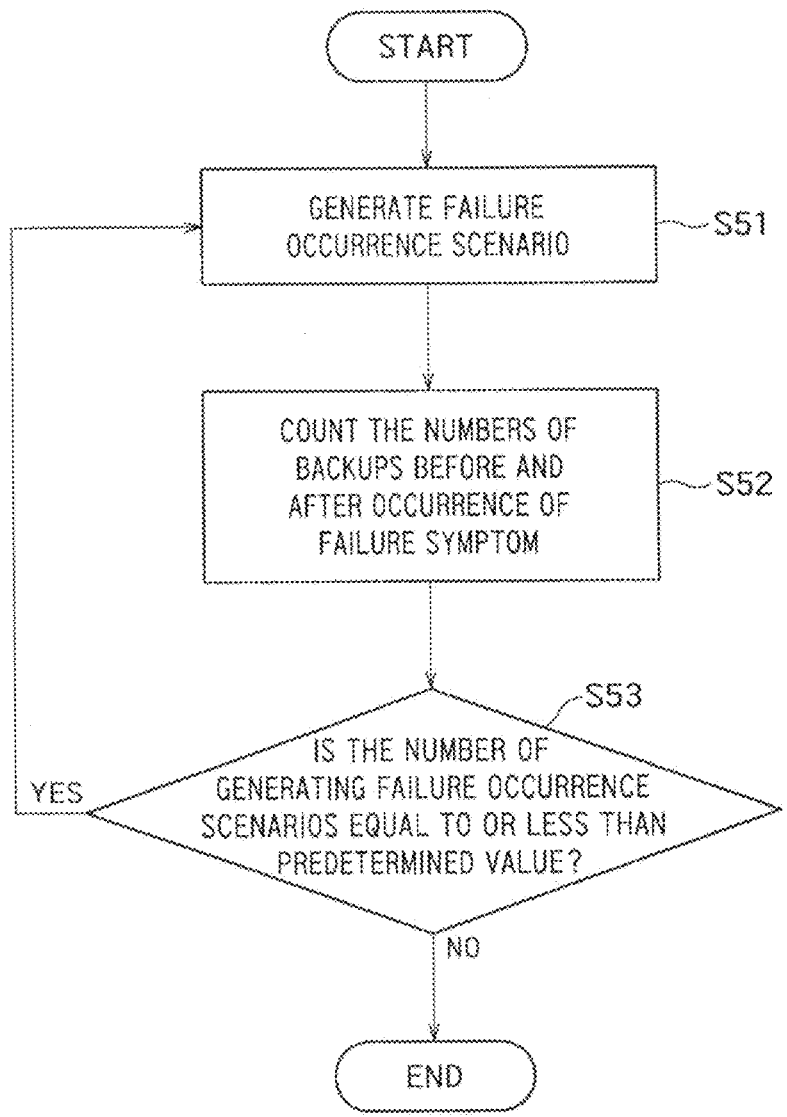
FIG. 11 is a flowchart pertaining to backup interval evaluation.

FIG. 10 shows a block diagram related to a backup interval evaluator 13, which is extracted from FIG. 1. FIG. 11 shows a flow for illustrating an operation of the backup interval evaluator 13. This flow partially includes the operation of the failure occurrence scenario generator 11.

After the failure occurrence scenario generator 11 generates the failure occurrence scenario (S51), the backup interval evaluator 13 calculates the number of backups until the nearest one of time points of occurrence of a failure, replacement, and a lapse of a designated time period after the current time point, and the size of data to be backed up (S52) according to the failure occurrence scenario. The value of the backup interval alternative shown in FIG. 30 is used for calculating the number of backups. The data size is the data size of the difference from the preceding backup. A variation of step S52 may be adopted. According to the variation, the number of backups until a lapse of a designated time period after the current time point, and the size of data to be backed up are calculated, and, if a failure occurs or replacement is performed in the meantime, a number of backups and a size of data to be backed up thereafter may be calculated according to a corrected scenario.

Figure 12:
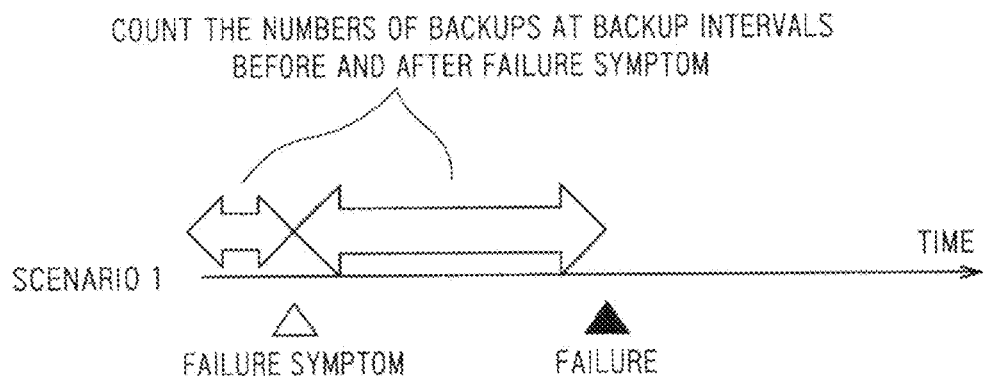
FIG. 12 is a diagram for illustrating a specific example of backup interval evaluation.

If a failure symptom occurs in the failure occurrence scenario, the numbers of backups before and after the failure symptom are respectively counted according to backup intervals before and after the failure symptom (S52). FIG. 12 shows an example of calculating the number of backups from the current time point to occurrence of the failure symptom, and the number of backups from the occurrence of the failure symptom to a failure.

If the number of failure occurrence scenarios generated by the failure occurrence scenario generator 11 is equal to or less than a predetermined value, steps S51 and S52 are repeated (S53). If the number exceeds the predetermined value, the processing is finished.

Figure 13:
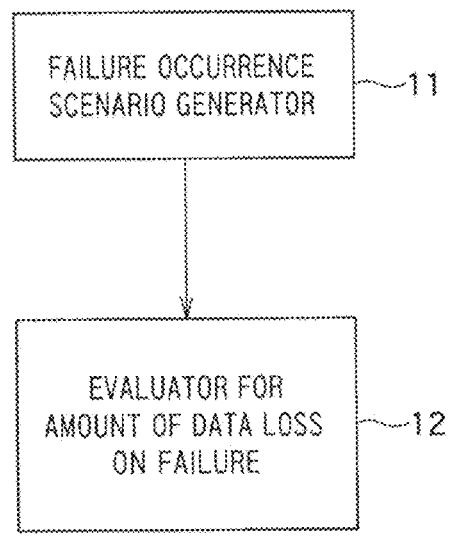
FIG. 13 is a block diagram pertaining to evaluation of an amount of data loss on failure.
Figure 14:
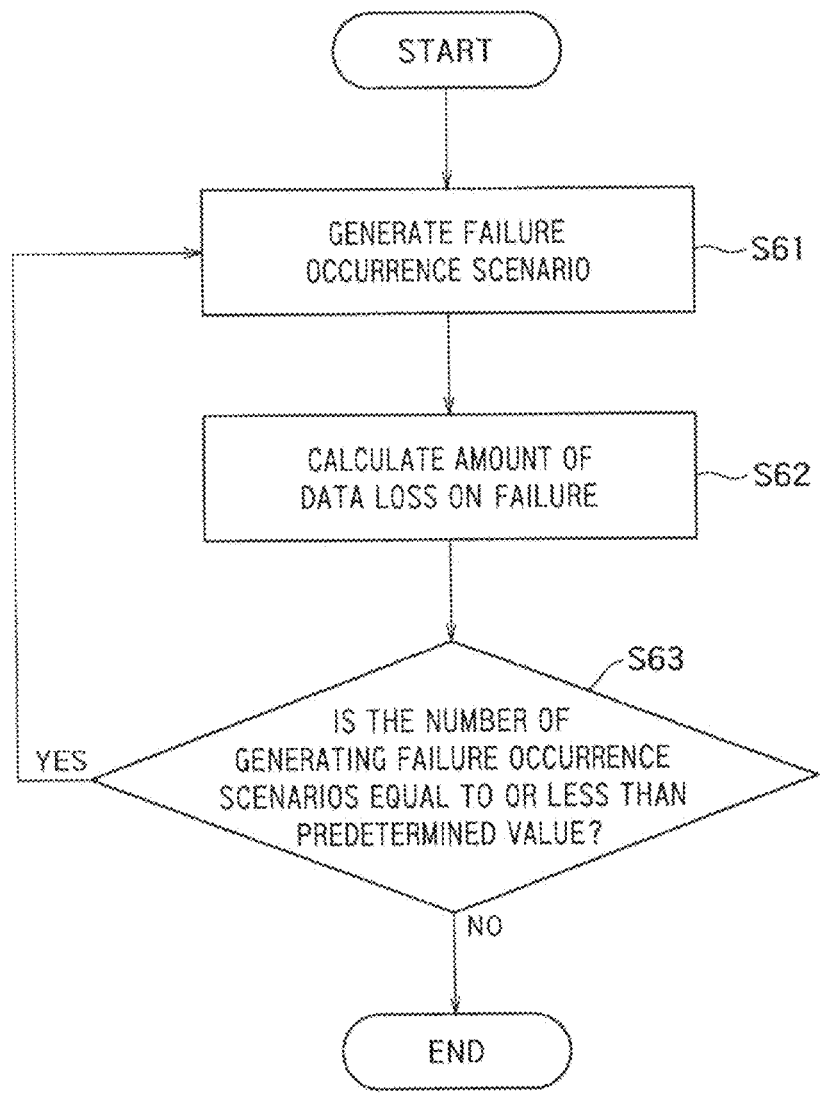
FIG. 14 is a flowchart pertaining to evaluation of the amount of data loss on failure.

FIG. 13 is a block diagram related to an evaluator 12 for the amount of data loss on failure (a data loss amount evaluator 12), which is extracted from FIG. 1. FIG. 14 shows a flow for illustrating an operation of the data loss amount evaluator 12. This flow partially includes an operation of the failure occurrence scenario generator 11.

Figure 15:
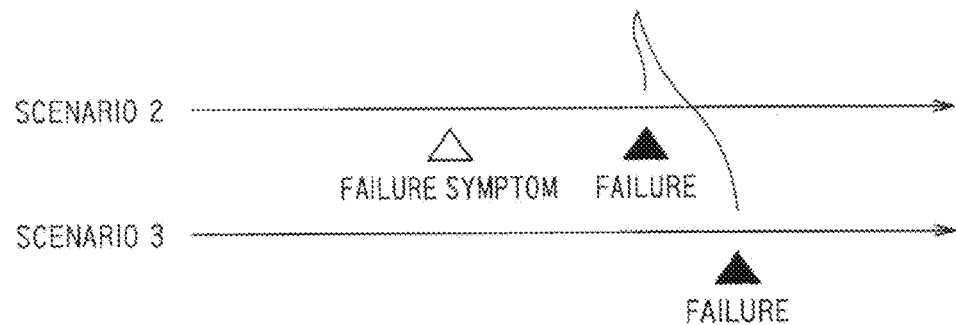
FIG. 15 is a diagram for illustrating a specific example of evaluating the amount of data loss on failure.

After the failure occurrence scenario generator 11 generates the failure occurrence scenario (S61), the data loss amount evaluator 12 calculates the amount of data loss on the basis of the time period from the latest backup to the occurrence of a failure (S62). As shown in FIG. 15, the amounts of data loss in the cases with and without occurrence of the failure symptom are respectively calculated on the basis of the backup interval. If the number of failure occurrence scenarios generated by the failure occurrence scenario generator 11 is equal to or less than the predetermined value, steps S61 and S62 are repeated (S63). If the number exceeds the predetermined value, the processing is finished.

The amount of data loss can be determined according to any method. For instance, the amount of loss may be the number of days, or a data size (the number of bytes) acquired by multiplying the number of days by the amount of increase in data per unit time. Instead, the amount may be the number of data reference times acquired by multiplying the number of operators (or users) by the number of data reference times per operator. Instead, the amount may be presence or absence of the data on each data type. The amount of data loss may be the average of each scenario, or percentile point (e.g., upper 95 percentile point).

Figure 16:
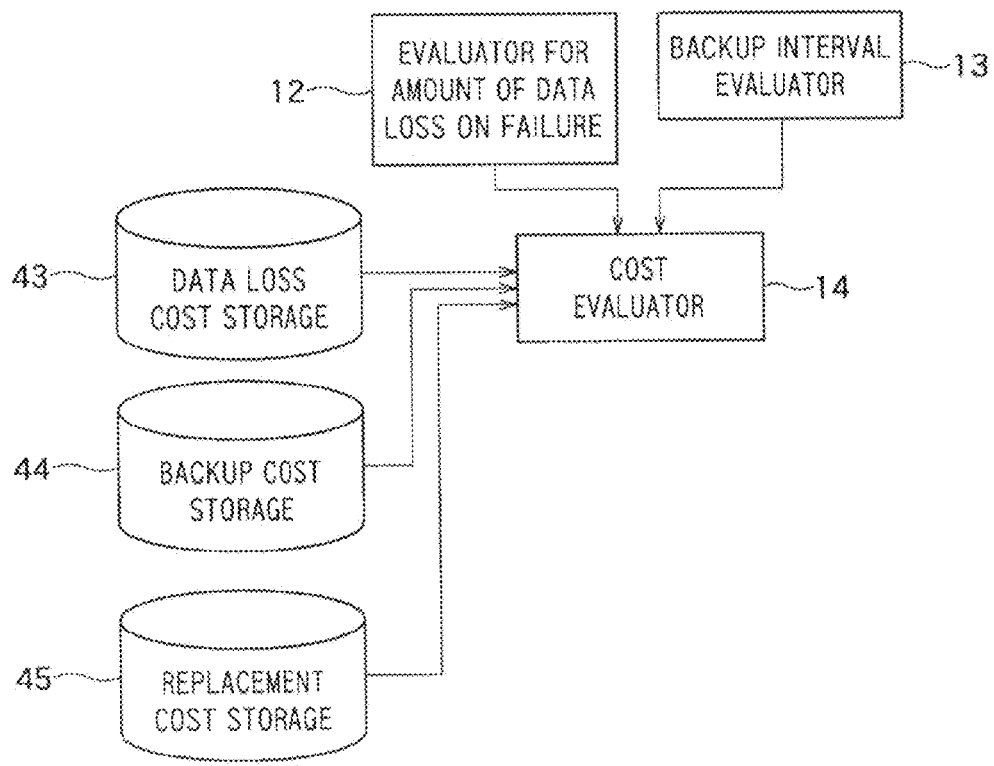
FIG. 16 is a block diagram pertaining to cost evaluation.
Figure 17:
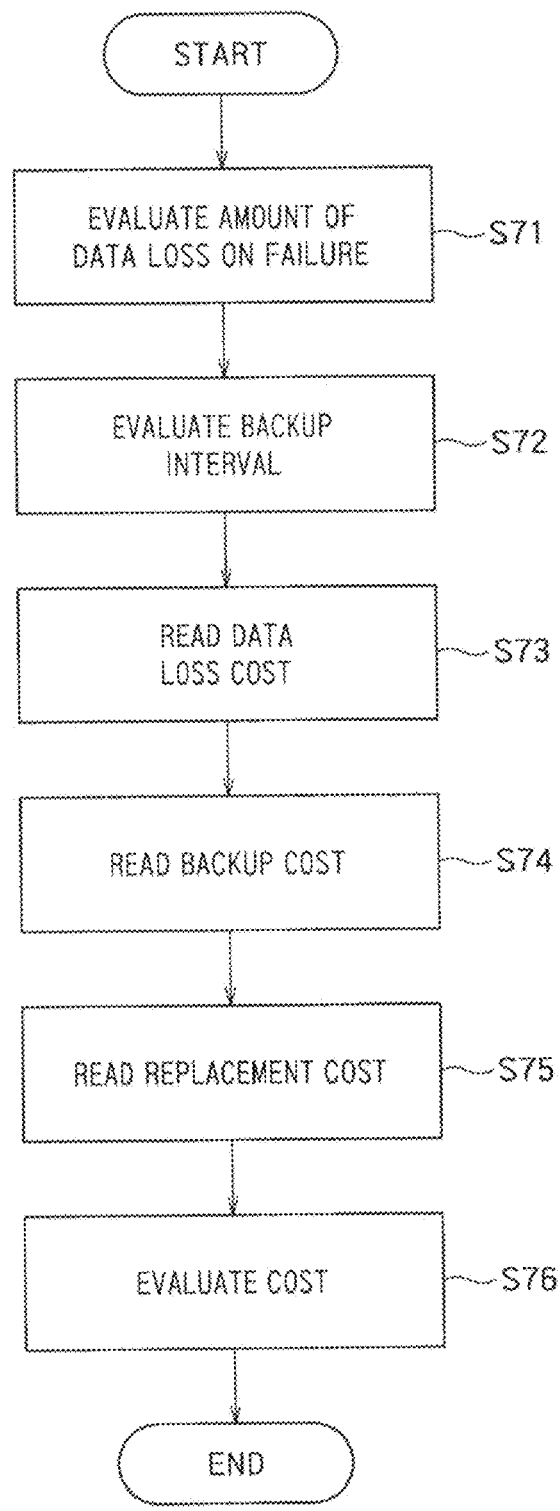
FIG. 17 is a flowchart pertaining to cost evaluation.

FIG. 16 shows a block diagram related to a cost evaluator 14, which is extracted from FIG. 1. FIG. 17 shows a flow for illustrating an operation of the cost evaluator 14. This flow partially includes operations of the data loss amount evaluator 12 and the backup interval evaluator 13.

The data loss amount evaluator 12 calculates the amount of data loss (S71). The backup interval evaluator 13 calculates the backup interval (S72). The cost evaluator 14 acquires a scenario-averaged data loss cost with respect to the amount of data loss evaluated by the data loss amount evaluator 12 (S73). Here, data loss costs that are stored in a data loss cost storage 43 and defined according to the types of the amounts of data loss can be used. These costs may be, for instance, the cost on each data type, the cost on each number of data reference times, and the cost on each data size. Instead, a cost per day may be defined and used. FIG. 18 shows an example of the data loss cost.

Next, the cost evaluator 14 acquires a scenario-averaged backup cost with respect to the number of backups evaluated by the backup interval evaluator (S74). Here, backup costs on respective items stored in the backup cost storage can be used. These costs may be, for instance, the cost on each backup frequency (after occurrence of a failure symptom), the cost on each backup frequency (before occurrence of a failure symptom), the cost on each amount of data communication, and the cost on the amount of data to be stored (backup data size). The scenario-averaged backup cost may be determined on the basis of the data size as well as the number of backups. FIG. 19 shows an example of the backup cost.

Next, the cost evaluator 14 reads various replacement costs stored in the replacement cost storage 45 with respect to the replaced HDD and PC. The replacement costs may be, for instance, the cost of each type of replacement device for a management PC, and the cost for each age of the devices. FIG. 20 shows an example of the replacement cost. The sum of the read costs is calculated, and an average is taken between scenarios, thereby acquiring the replacement cost (S75).

The cost evaluator 14 calculates a total weighted sum of the scenario-averaged data loss cost, the scenario-averaged backup cost, and the scenario-averaged replacement cost to thereby acquire a cost evaluation value (S76). In the case where each weight is "1", the sum of the scenario-averaged data loss cost, the scenario-averaged backup cost, and the scenario-averaged replacement cost may simply be calculated.

Here, the scenario-averaged backup cost and the scenario-averaged data loss cost are calculated as follows.

It is defined that the backup interval days before occurrence of a symptom is "X", and the backup interval days after occurrence of a symptom is "Y". It is also defined that the backup cost for one time before occurrence of a symptom is "A", and the cost after occurrence of the symptom is "B". In the example shown in FIG. 19, the values of "A" and "B" are not proportional to the number of times; however, for the simplicity, it is regarded that the backup cost is proportional to the number of times. The data loss cost for one day is defined as "C". In FIG. 18, the cost is defined with respect to the data size and the like. Here, for the simplicity, it is regarded that the data loss cost is proportional to the number of days during which no backup is made.

The generated scenario-averaged backup cost "g" and scenario-averaged data loss cost "h" are calculated as follows.

The order of calculation of the scenario-averaged data loss cost, the scenario-averaged backup cost, and the scenario-averaged replacement cost is arbitrary.

scenario-averaged backup cost $g=(A\times$(the total number of backups before occurrence of a failure symptom)$+B\times$(the total number of backups after occurrence of the failure symptom))/the number of scenarios scenario-averaged data loss cost $h=C\times$(the number of cases where a failure occurs without occurrence of a symptom$\times X/2$+the number of cases where a failure occurs after a symptom occurs$\times Y/2$)/the number of scenarios In this example, each of the backup costs, the data loss costs, the replacement costs on the scenarios is averaged between the scenarios. This embodiment is not limited thereto. The total of the backup cost, the data loss cost and the replacement cost may be respectively calculated on the predetermined number of scenarios, and the total sum of the totals between scenarios may be taken and adopted as the cost evaluation value.

Figure 5:
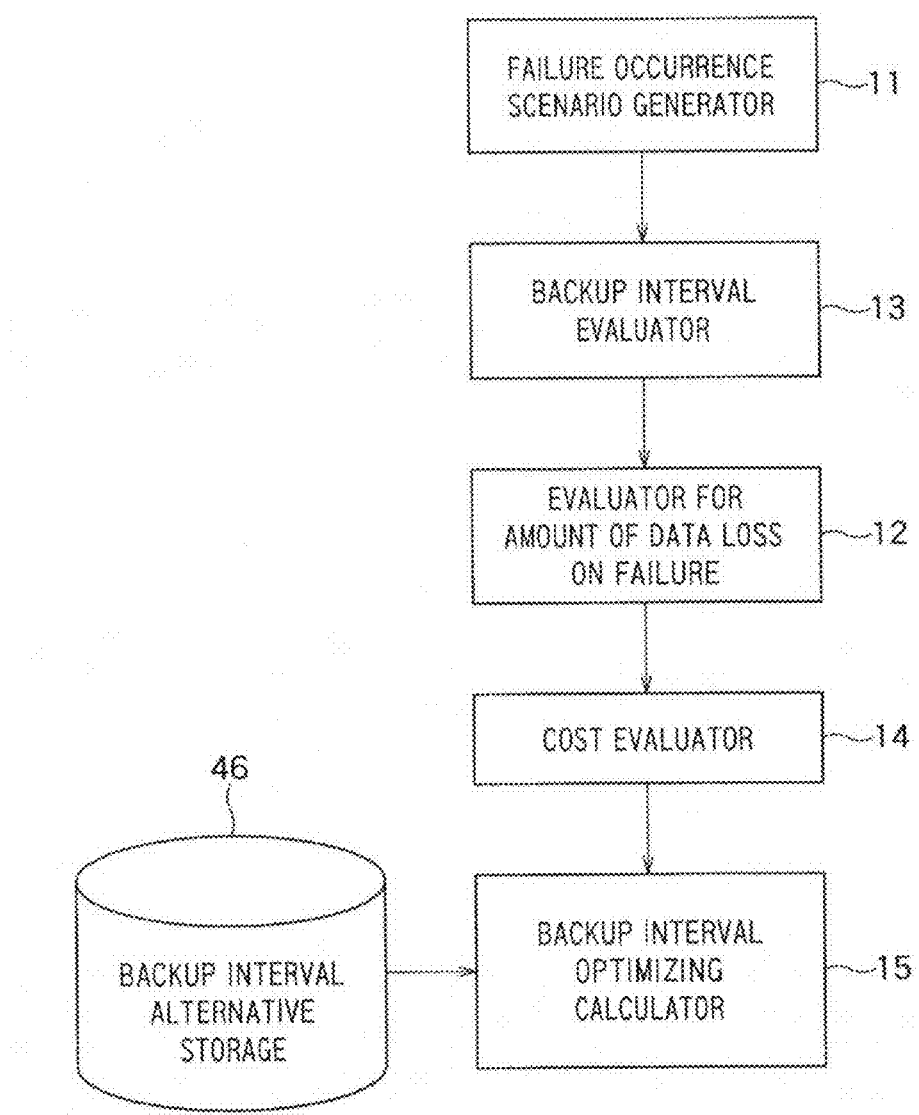
FIG. 5 is a block diagram pertaining to setting of the optimal backup interval.
Figure 6:
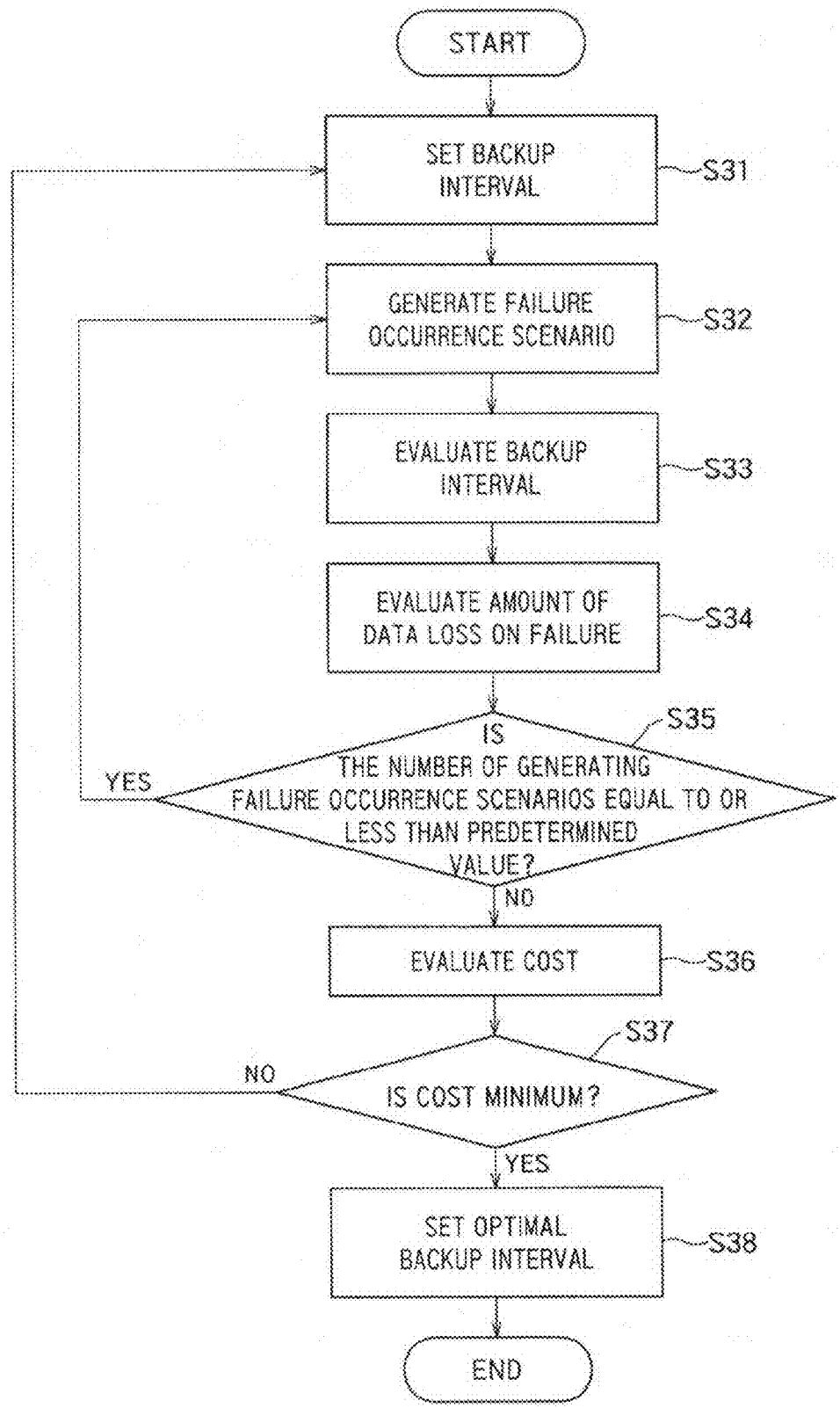
FIG. 6 is a flowchart pertaining to setting of the optimal backup interval.

FIG. 5 is a block diagram related to a backup interval optimizing calculator 15, which is extracted from FIG. 1. FIG. 6 is a flow for illustrating an operation of the backup interval optimizing calculator 15. This flow partially includes operations of the data loss amount evaluator 12, the backup interval evaluator 13, and the cost evaluator 14.

The backup interval optimizing calculator 15 determines an optimal backup interval that allows the cost evaluation value calculated by the cost evaluator 14 to be minimum, from a backup interval alternative list stored in a backup interval alternative storage 46. FIG. 30 shows an example of the backup interval alternative list.

The failure occurrence scenario is generated on each alternative of backup intervals (S31 and S32). The cost evaluation values on the respective alternatives are compared (S33, S34, S35 and S36). The backup interval that allows the cost evaluation value to be minimum or equal to or less than a threshold is determined as an optimal backup interval on each time period before and after a failure symptom (S38).

Figure 21:
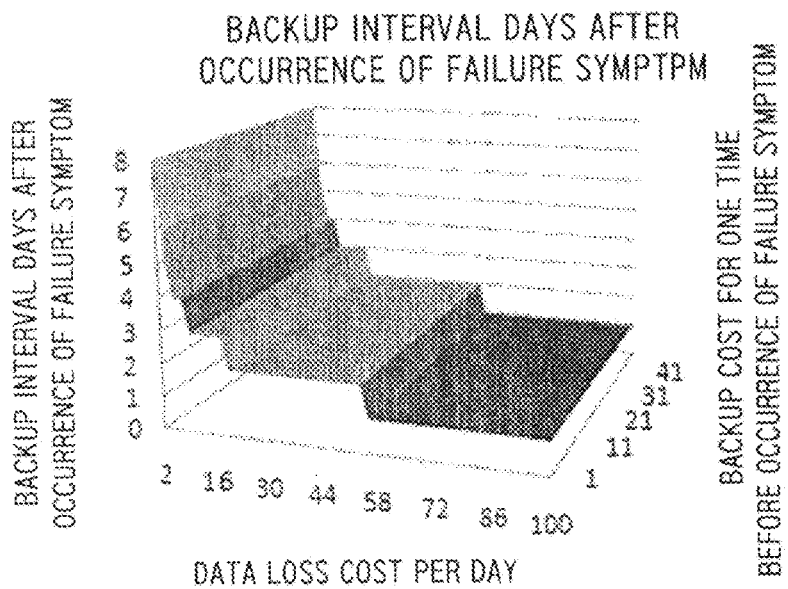
FIG. 21 is a graph of backup interval optimization after occurrence of a symptom.
Figure 22:
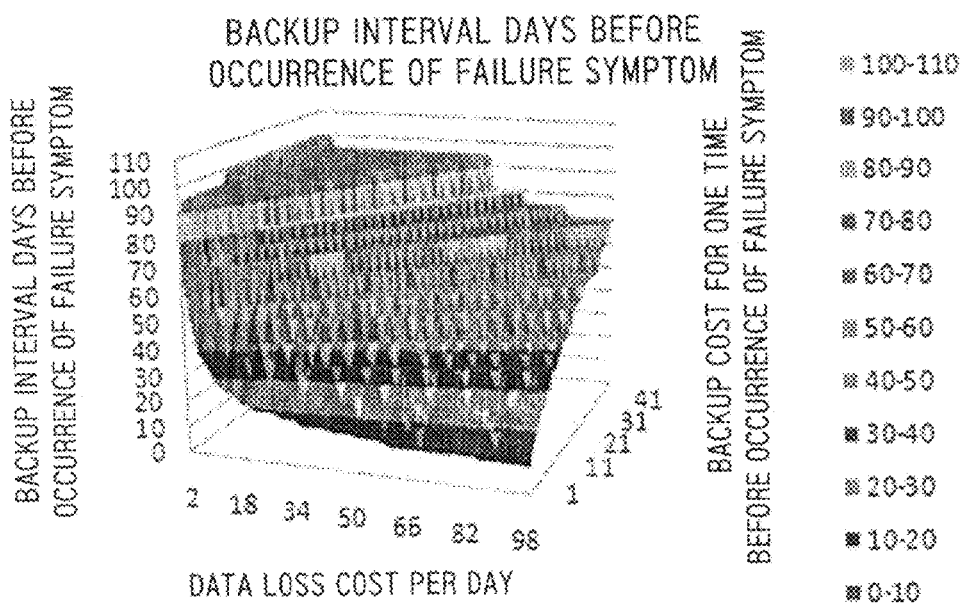
FIG. 22 is a graph of backup interval optimization before occurrence of a symptom.

FIGS. 21 and 22 show results on calculation of the backup interval that allows the sum of the scenario-averaged backup cost and the scenario-averaged data loss cost that are calculated by the above expressions to be minimum, on each time period before and after a failure symptom. Here, for the simplicity, the replacement cost is not taken into account. The optimal backup intervals before and after a failure symptom are shown in graphs, where the backup cost "A" for one time before occurrence of a failure symptom, and the data loss cost "C" per day are taken as abscissae. FIG. 21 is a graph of the backup interval after occurrence of a symptom. FIG. 22 is a graph of the backup interval before occurrence of a symptom. As shown in FIG. 21, the higher the data loss cost is, the shorter the backup interval is. As shown in FIG. 22, the higher the data loss cost is, the shorter the backup interval is; the lower the backup cost for one time, the shorter the backup interval is.

Figure 3:
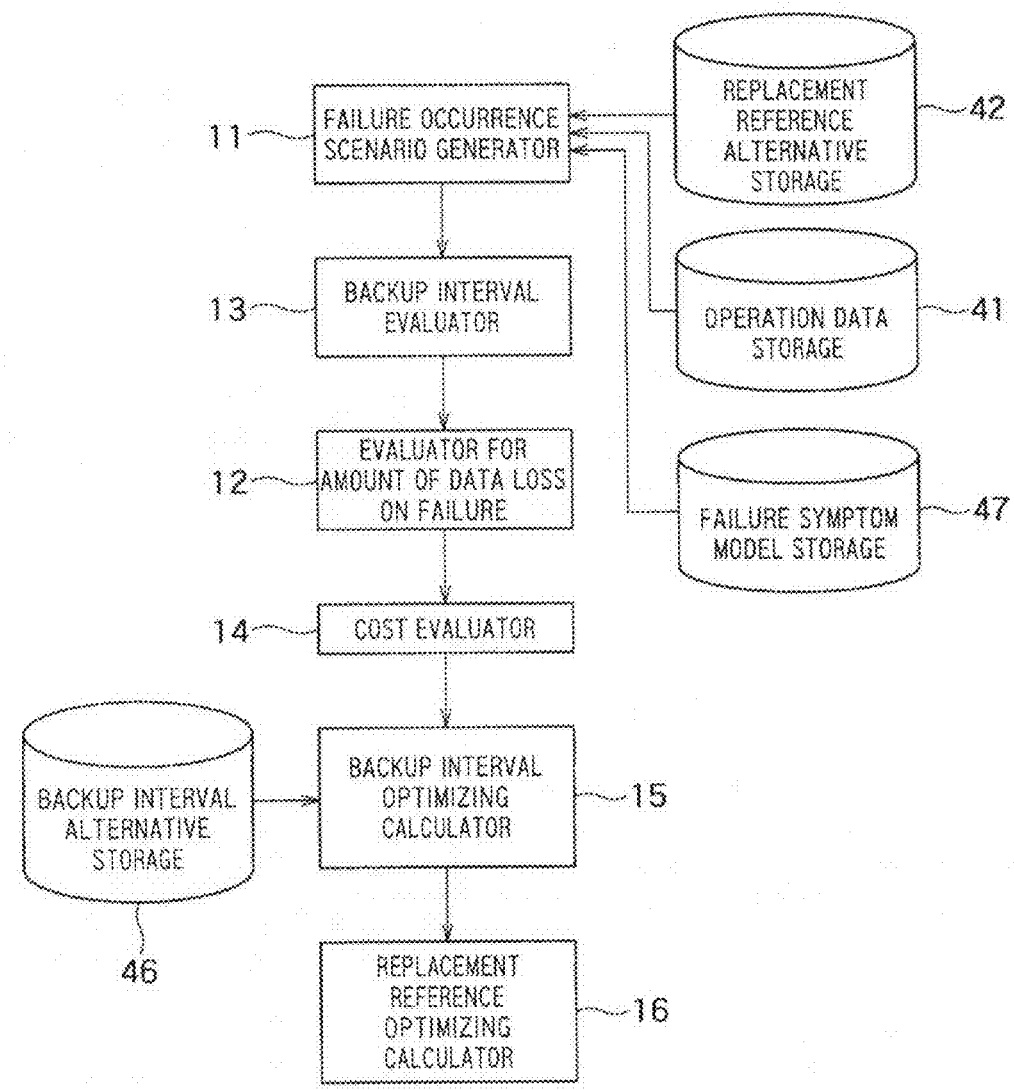
FIG. 3 is a block diagram pertaining to setting of an optimal replacement reference and a backup interval.
Figure 4:
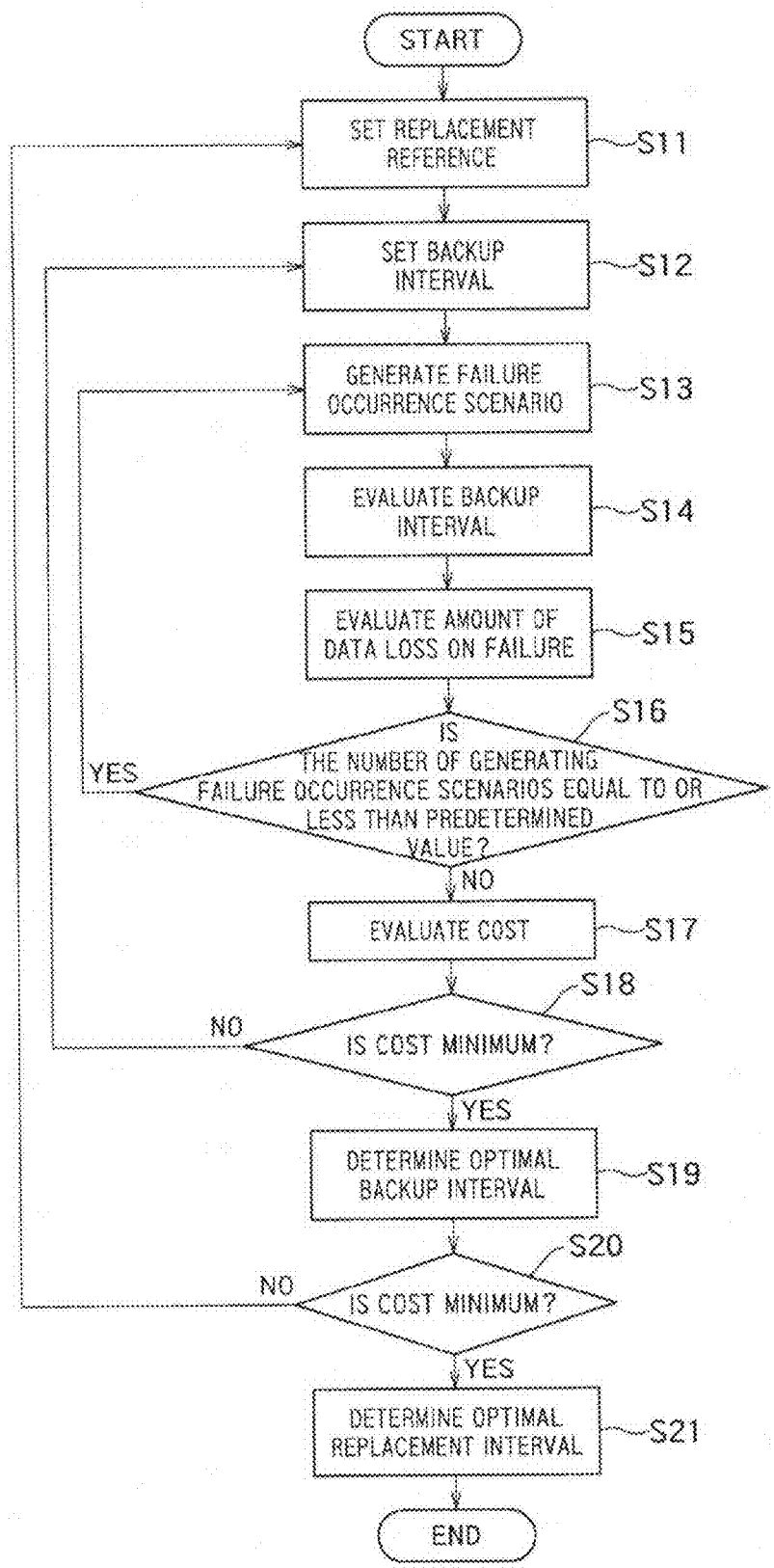
FIG. 4 is a flowchart pertaining to setting of the optimal replacement reference and the backup interval.

FIG. 3 shows a block diagram related to a replacement reference optimizing calculator 16, which is extracted from the FIG. 1. FIG. 4 shows a flow for illustrating an operation of the replacement reference optimizing calculator 16. This flow partially includes operations of the data loss amount evaluator 12, the backup interval evaluator 13, the cost evaluator 14 and the backup interval optimizing calculator 15.

The replacement reference optimizing calculator 16 determines a replacement reference that allows the cost evaluation value evaluated by the cost evaluator 14 to be minimum, from among alternatives or combinations of the alternatives. FIG. 29 shows an example of four alternatives of a replacement reference on the failure probability, operation time, elapsed years from installation, and HDD read error rate.

The above described optimal backup interval is determined on each replacement reference (S11 and S12). The cost evaluation value is calculated on each case (S13, S14, S15, S16, S17, and S18). The replacement reference optimizing calculator 16 calculates the cost evaluation value on each alternative of the replacement reference (S20). A replacement reference that allows the cost evaluation value to be minimum is selected from among those alternatives of the replace reference (S21). The selected replacement reference is common to each PC. Subsequently, the replacement reference optimizing calculator 16 transmits information on the selected replacement reference to the replacement notifier 23 in the PC. The PC replaces the previous replacement reference with the received replacement reference. A user of the PC may replace the HDD or PC if the replacement reference is satisfied. In the case where the replacement reference is based on the failure probability (see FIG. 29), the data preserving apparatus may notify the failure symptom model to the PC and then the PC by itself may calculate the failure probability from the operation data. Instead, the data preserving apparatus may periodically calculate the failure probability and notify the calculated failure probability to the PC. Instead, the data preserving apparatus may store the selected replacement reference and, upon detecting matching of the replacement reference, may transmit a replacement instruction to the PC.

Figure 23:
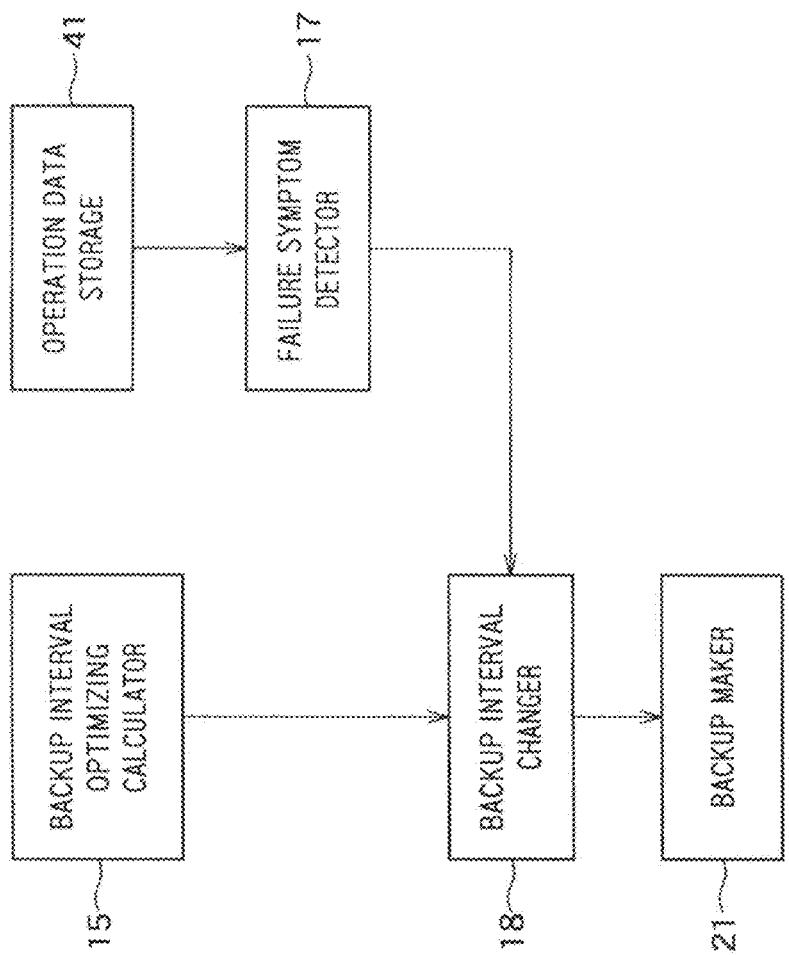
FIG. 23 is a block diagram pertaining to change of the backup interval.
Figure 24:
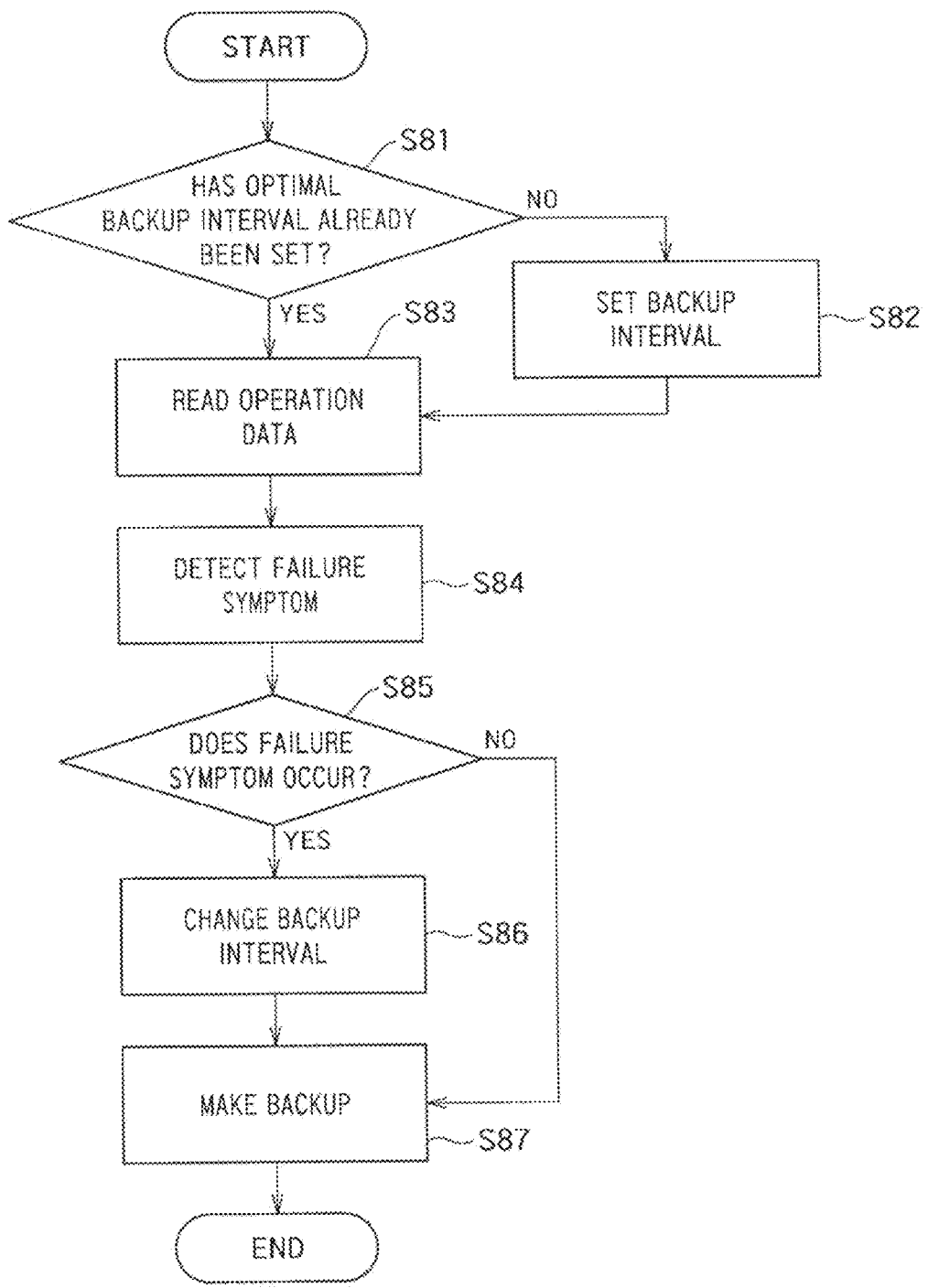
FIG. 24 is a flowchart pertaining to backup interval setting.

FIG. 23 shows a block diagram related to the backup interval changer 18 and the failure symptom detector 17, which are extracted from FIG. 1. FIG. 24 is a flowchart for illustrating operations of the backup interval changer 18 and the failure symptom detector 17. This operation flow partially includes an operation on the PC side.

If the optimal backup interval has already been set in the backup interval optimizing calculator 15 (S81 and S82), the failure symptom detector 17 reads the previous operation data and the failure symptom model (S83) and performs a process of detecting an HDD failure symptom in each PC (S84). For instance, if the value of the failure symptom model exceeds the threshold, it is determined that a failure symptom occurs. This data preserving apparatus periodically acquires the operation data from each PC.

The backup interval changer 18 determines to change the HDD backup interval in the corresponding PC to the backup interval after the failure symptom, which is optimized by the backup interval optimizing calculator, according to the detected failure symptom (S86), and notifies information on the optimized backup interval to the PC. If the optimal backup interval is changed after the notification, the changed optimal backup interval may be notified. In this case, the PC makes a backup at the notified latest backup interval.

Here, the example of changing the backup interval after detecting the failure symptom has been exemplified. However, the PC is notified of the backup interval before a failure symptom every time when the backup interval is calculated by the backup interval optimizing calculator 15. The PC makes a backup before a failure symptom at the backup interval.

The backup maker 21 in the PC makes a backup of the HDD in each PC at the backup interval notified by the backup interval changer 18 in the data preserving apparatus (S87).

When the backup notifier 22 in the PC makes a backup of the HDD in the PC, this notifier notifies information thereon to the management server.

When the HDD is replaced in each PC, the replacement notifier 23 in each PC notifies information thereon to the management server.

Figure 25:
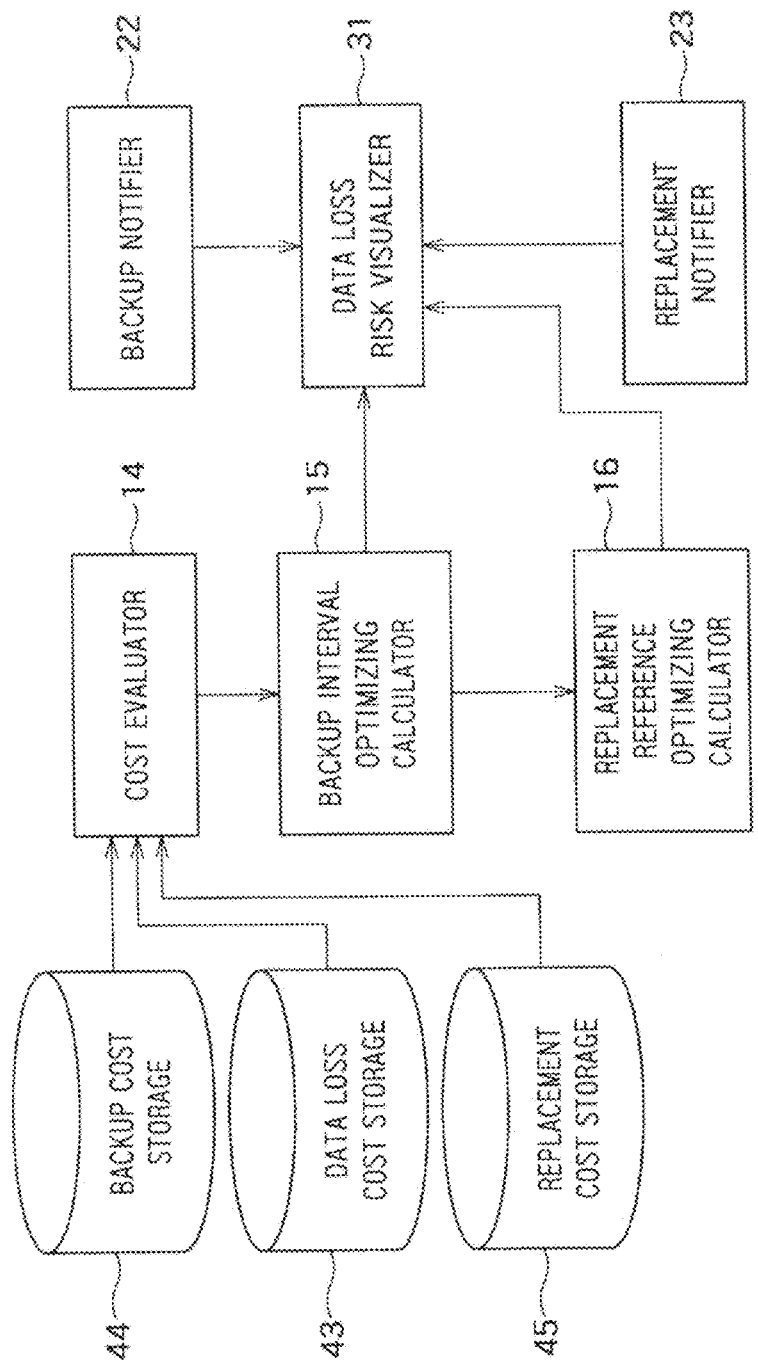
FIG. 25 is a block diagram pertaining to data loss risk visualization.
Figure 26:
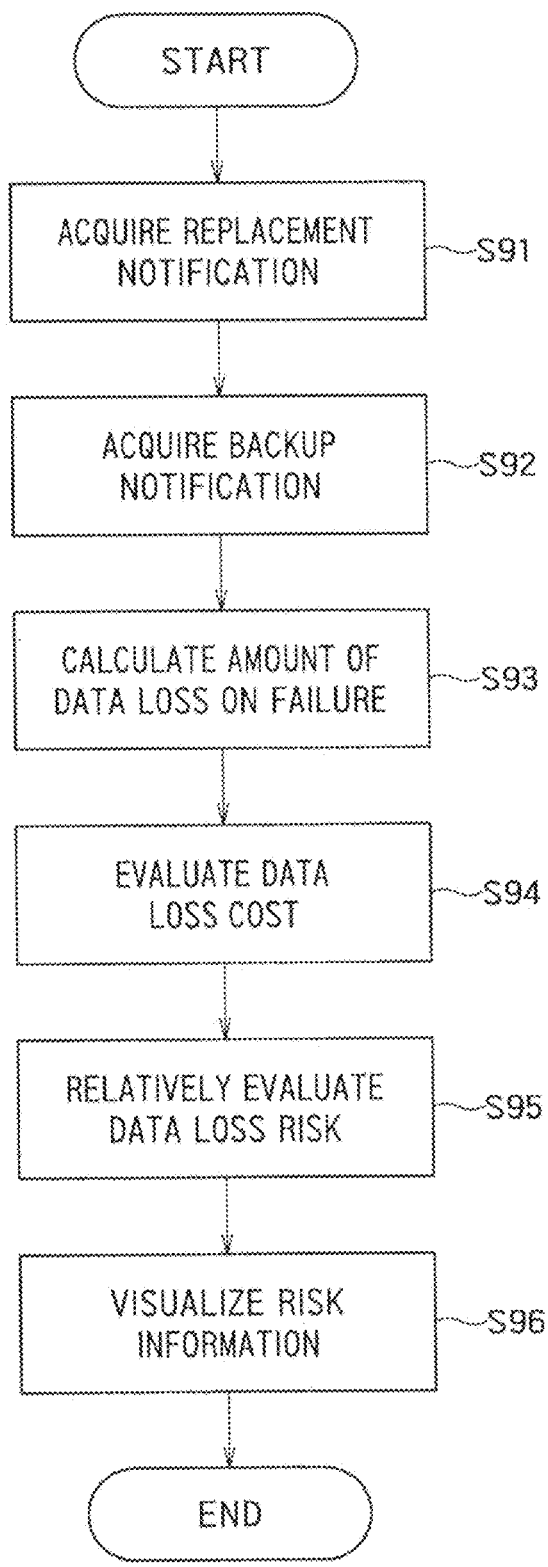
FIG. 26 is a flowchart pertaining to data loss risk visualization.

FIG. 25 is a block diagram related to the data loss risk visualizer 31 in the management server, which is extracted from FIG. 1. FIG. 26 is a flowchart for illustrating an operation of the data loss risk visualizer 31. This operation flow partially includes an operation on the PC side.

The data loss risk visualizer 31 in the management server acquires the replacement notification from the replacement notifier 23 in the PC (S91), acquires the backup notification from the backup notifier 22 in the PC (S92), and acquires a calculation result of the amount of data loss on failure from the cost evaluator 14 of the data preserving apparatus (S93). The data loss cost or the amount of data loss of the entire PC to be managed is calculated on the basis of the acquired information (S94), and visualized as a graph and the like (S96). The data loss risk visualizer 31 may calculate the average or percentile point of amounts of data loss on each scenario, as the amount of data loss. The amount of data loss in each PC is relatively compared (S95). A PC with a high amount of data loss is identified, made into a list, and visualized in a table form or the like. FIG. 31 shows an example of information displayed by the data loss risk visualizer 31. The ranks of HDDs are classified according to the failure probabilities.

Here, the amount of data loss of the entire PC may be calculated as follows. The amounts of data loss on each scenario calculated by the data loss amount evaluator on the respective PCs are summed up for all the PCs, thereby calculating the entire amount of data loss.

According to another method, first, on the basis of a backup notification acquired from each PC, it is calculated for how many days the data is accumulated after the latest backup in each PC, based on the number of elapsed days from the latest backup in each PC. Then, the method grasps the amount of data loss (the number of days) in case where each PC causes a failure at the current time point (FIG. 31). Next, the HDD failure probability for each PC is calculated by the failure symptom detector. The amount of data loss for all the PCs is calculated by summing up each value (HDD failure probability for each PC×the amount of data loss in case where each PC causes a failure) for all the PCs. Instead, only for narrowed down PCs having high HDD failure probabilities (not less than the threshold), the amounts of data loss may be summed up.

Embodiment 2

Figure 2:
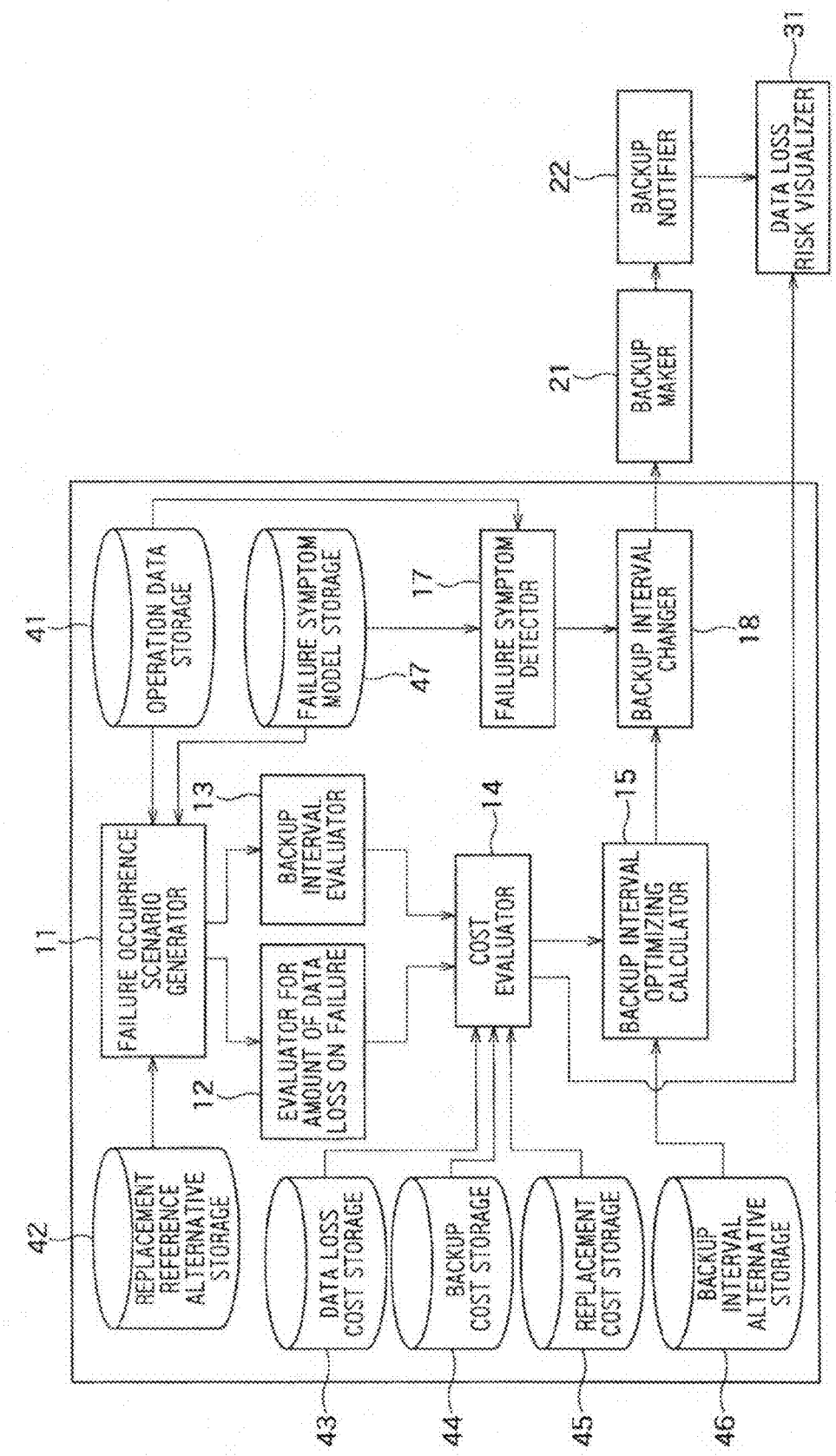
FIG. 2 is a diagram showing a system including a data preserving apparatus according to Embodiment 2.

FIG. 2 shows an example of a system including a data preserving apparatus according to this embodiment. In this embodiment, the replacement reference optimizing calculator is not provided in the data preserving apparatus. The backup interval is optimized only according to the predetermined replacement reference stored in the replacement reference alternative storage 42.

Embodiment 3

In this embodiment, the backup interval is changed according to the failure symptom type.

As shown in FIG. 32, in the case where transition of the failure probability is different according to the failure symptom type, the backup frequency is changed according to the failure symptom type in this embodiment. In particular, in a time span during which the failure probability is temporarily high (a beginning part of time in the distribution of the failure symptom B in FIG. 32), it is preferable that the backup interval be at high frequency. That is, the backup interval for the time span is set shorter than that for the following time span. For instance, this may be achieved by other methods, which are reduction in the value of the backup cost (FIG. 19) in the time span, or change of parameters of the calculation expression. FIG. 34 shows change of the backup interval according to the failure probability. Thus, the backup interval is set according to the failure probability instead of presence or absence of the failure symptom. Accordingly, the backup frequency in the time span during which the failure probability is high in a short term is increased, and, if the failure probability becomes low, the backup frequency can be set to be reduced.

As with Embodiment 1, the data in FIG. 34 is stored in the backup interval alternative storage 46. If the failure probability temporally transitions, the backup interval is changed according to the data in FIG. 34.

As with Embodiment 1, the backup interval optimizing calculator 15 determines the method of changing the optimal backup interval according to change in failure probability by selecting from among the backup interval alternatives shown in FIG. 34.

The data preserving apparatus which has been heretofore described may also be realized using a general-purpose computer device as basic hardware. That is, each unit in the data preserving apparatus can be realized by causing a processor mounted in the above described computer device to execute a program. In this case, the data preserving apparatus may be realized by installing the above described program in the computer device beforehand or may be realized by storing the program in a storage medium such as a CD-ROM or distributing the above described program over a network and installing this program in the computer device as appropriate. Furthermore, the storages in the communication device may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data preserving apparatus that determines a backup interval of a storage device having data stored therein, comprising:

a failure occurrence scenario generator configured to randomly generate a plurality of scenarios that represent presence or absence of occurrence of a failure, presence or absence of a failure symptom, a time point of occurrence of a failure in a case with occurrence of a failure, and a time point of occurrence of a failure symptom in a case with a failure symptom, on the basis of operation data of a computer provided with the storage device, a failure symptom detecting model for detecting a failure symptom from the operation data, and a failure rate of the storage device;

a data loss amount evaluator configured to calculate an amount of data loss due to a failure on the scenario with occurrence of the failure among the scenarios, on the basis of a first backup interval that is a backup interval used before occurrence of a failure symptom, and a second backup interval that is a backup interval used after occurrence of a failure symptom;

a backup interval evaluator configured to calculate a number of backups performed for each of the scenarios, on the basis of the first backup interval and the second backup interval;

a cost evaluator configured to calculate a cost evaluation value on the basis of the amount of data loss and the number of backups for each of the scenarios;

a backup interval optimizing calculator configured to determine the first backup interval and the second backup interval such that a total of the cost evaluation values for the respective scenarios or an average of the cost evaluation values for the respective scenarios is minimized or less than a threshold; and a backup interval changer configured to notify to the computer at least the second backup interval out of the first backup interval and the second backup interval that are determined by the backup interval optimizing calculator.

2. The data preserving apparatus according to claim 1, further comprising a failure symptom detector configured to detect a failure symptom of the computer, on the basis of the operation data and the failure symptom detecting model, wherein if the failure symptom is detected by the failure symptom detector, the backup interval changer notifies to the computer an instruction for making a backup at the second backup interval.

3. The data preserving apparatus according to claim 1, wherein the failure occurrence scenario generator generates the scenarios, on the basis of the following items:

a failure rate in a case with detection of a failure symptom that is a probability that after the failure symptom is detected, a failure occurs in a predetermined time period;

a failure rate in a case without detection of the failure symptom that is a probability that a failure occurs but no failure symptom is detected in a predetermined time period before the occurrence of the failure;

a preliminary symptom detection rate in a normal operation that is a probability that no failure occurs in a predetermined time period after a failure symptom is detected; and a failure symptom non-detection rate in a normal operation that is a probability that no failure occurs and no failure symptom is detected before a predetermined time period.

4. The data preserving apparatus according to claim 1, wherein the data loss amount evaluator calculates the cost evaluation value according to a type of data to be backed up.

5. The data preserving apparatus according to claim 1, wherein the backup interval optimizing calculator changes the second backup interval according to a relationship between an operation time lapsed after occurrence of a failure symptom and a failure probability.

6. The data preserving apparatus according to claim 5, wherein the backup interval optimizing calculator shortens a value of the second backup interval in a time span in which the failure probability temporarily becomes higher.

7. The data preserving apparatus according to claim 5, wherein the backup interval optimizing calculator specifies a failure probability based on the relationship between the operation time elapsed after occurrence of the failure symptom and the failure probability according to the operation time elapsed after occurrence of the failure symptom, and determines the second backup interval according to the failure probability.

8. The data preserving apparatus according to claim 5, wherein the failure occurrence scenario generator randomly selects a type of the failure symptom on the basis of occurrence probabilities of types of the failure symptom, the relationship between the operation time elapsed after occurrence of the failure symptom and the failure probability is provided for each of the types of the failure symptom, and the backup interval optimizing calculator uses the relationship corresponding to the determined type to change the second backup interval.

9. The data preserving apparatus according to claim 1, wherein the failure occurrence scenario generator generates the scenarios that further represent presence or absence of replacement, according to a replacement reference of the storage device, and the apparatus further comprises a replacement reference optimizing calculator configured to select, from among a plurality of alternatives for the replacement reference, one replacement reference according to which the total or the average of the cost evaluation values is minimum or less or equal to than the threshold, and notify to the computer the selected replacement reference.

10. The data preserving apparatus according to claim 1, wherein the backup interval optimizing calculator selects the first backup interval and the second backup interval from among a plurality of backup interval alternatives.

11. A data preservation system, comprising:
at least one data preserving apparatus according to claim 1; and
a management server including a data loss amount calculator configured to
receive a backup situation of the storage device from each computer and information on a failure probability of each computer from the data preserving apparatus wherein the data preserving apparatus is configured to calculate the failure probability of each computer based on the operation data thereof, or receive the amount of data loss for the scenario calculated by the data loss amount evaluator on each computer, from the data preserving apparatus, and
calculate amount of data loss of entire computers on the basis of the backup situation and the failure probability of each computer, or on the basis of the amount of data loss for the scenario on each computer.

12. A data preserving method that determines a backup interval of a storage device having data stored therein, comprising:
generating randomly a plurality of scenarios that represent presence or absence of occurrence of a failure, presence or absence of a failure symptom, a time point of occurrence of a failure in a case with occurrence of a failure, and a time point of occurrence of a failure symptom in a case with a failure symptom, on the basis of operation data of a computer provided with the storage device, a failure symptom detecting model for detecting a failure symptom from the operation data, and a failure rate of the storage device;

calculating an amount of data loss due to a failure on the scenario with occurrence of the failure among the scenarios, on the basis of a first backup interval that is a backup interval used before occurrence of a failure symptom, and a second backup interval that is a backup interval used after occurrence of a failure symptom;

calculating a number of backups performed for each of the scenarios, on the basis of the first backup interval and the second backup interval;

calculating a cost evaluation value on the basis of the amount of data loss and the number of backups for each of the scenarios;

determining the first backup interval and the second backup interval such that a total of the cost evaluation values for the respective scenarios or an average of the cost evaluation values for the respective scenarios is minimized, or less or equal to than a threshold; and notifying to the computer at least the second backup interval out of the first backup interval and the second backup interval as determined.

* * * * *